(12) United States Patent
LaCroix et al.

(10) Patent No.: US 7,328,231 B2
(45) Date of Patent: Feb. 5, 2008

(54) GENERATING SCHEDULES FOR SYNCHRONIZING BULK DATA TRANSFERS TO END NODE DEVICES IN A MULTIMEDIA NETWORK

(75) Inventors: John LaCroix, Williston, VT (US); Mark Fagnani, Watertown, MA (US)

(73) Assignee: Navic Systems, Needham, MA (US)

( * ) Notice: Subject to any disclaimer, the term of this patent is extended or adjusted under 35 U.S.C. 154(b) by 564 days.

(21) Appl. No.: 09/967,900

(22) Filed: Oct. 2, 2001

(65) Prior Publication Data

US 2002/0087580 A1 Jul. 4, 2002

Related U.S. Application Data

(60) Provisional application No. 60/253,441, filed on Nov. 28, 2000.

(51) Int. Cl.
*G06F 15/16* (2006.01)
*G06Q 30/00* (2006.01)

(52) U.S. Cl. .................... 709/200; 709/219; 705/14

(58) Field of Classification Search ............ 709/226, 709/229, 219, 200; 705/8, 7, 9, 14; 370/432
See application file for complete search history.

(56) References Cited

U.S. PATENT DOCUMENTS

| 4,329,675 A | 5/1982 | Van Hulle |
| 4,331,974 A | 5/1982 | Cogswell et al. |
| RE33,808 E | 1/1992 | Wright, Jr. |
| 5,099,319 A | 3/1992 | Esch et al. ............. 358/86 |

(Continued)

FOREIGN PATENT DOCUMENTS

EP 1 071 287 A2 1/2001

(Continued)

*Primary Examiner*—Ario Etienne
*Assistant Examiner*—El Hadji Sall
(74) *Attorney, Agent, or Firm*—Hamilton, Brook, Smith & Reynolds, PC

(57) ABSTRACT

Promotions may be targeted to one or more device groups. A promotion/device group set relation is maintained for each promotion indicating the device groups to which each promotion should be sent. A device group corresponds to a statistically categorized group of end node devices (e.g. set top boxes) based on demographics or viewership history. A device group may be further subcategorized to include one or more transmission groups corresponding to the physical characteristics of the end node devices (e.g. hardware, memory capacity). A promotion server creates a package containing the promotion for each transmission group of the device group. If a package for a particular transmission group is already created and has sufficient available space, the promotion is simply added to the package. Therefore, a package created for a transmission group may hold promotions intended for different device groups even though not all of the promotions are targeted for the same devices. A schedule process then analyzes a set of packages, building a schedule for each end node device, ultimately assigning promotion identification, transmission times, port numbers, and/or multicast IP addresses for specific device groups. Schedule messages are then send out individually to each end node, so that the expected broadcast (multicast) message time, port, and IP address information is known by each device for each of the promotions which are intended for it to receive. The packaged promotions are then sent via bulk data transmission to the end nodes which is initiated by the generation and delivery of transmission requests to bulk data servers on the network.

31 Claims, 20 Drawing Sheets

U.S. PATENT DOCUMENTS

| | | | |
|---|---|---|---|
| 5,155,591 A | 10/1992 | Wachob | |
| 5,389,964 A | 2/1995 | Oberle et al. | |
| 5,442,637 A | 8/1995 | Nguyen | |
| 5,515,098 A | 5/1996 | Carles | 348/8 |
| 5,532,732 A | 7/1996 | Yuen et al. | |
| 5,559,548 A | 9/1996 | Davis et al. | |
| 5,579,055 A | 11/1996 | Hamilton et al. | |
| 5,583,561 A | 12/1996 | Baker et al. | |
| 5,583,576 A | 12/1996 | Perlman et al. | |
| 5,585,866 A | 12/1996 | Miller et al. | |
| 5,589,892 A | 12/1996 | Knee et al. | |
| 5,629,733 A | 5/1997 | Youman et al. | |
| 5,630,204 A | 5/1997 | Hylton et al. | |
| 5,635,978 A | 6/1997 | Alten et al. | |
| 5,673,089 A | 9/1997 | Yuen et al. | |
| 5,712,985 A * | 1/1998 | Lee et al. | 705/7 |
| 5,724,521 A | 3/1998 | Dedrick | 395/226 |
| 5,740,549 A | 4/1998 | Reilly et al. | |
| 5,774,170 A | 6/1998 | Hite et al. | |
| 5,781,246 A | 7/1998 | Alten et al. | |
| 5,790,170 A | 8/1998 | Suzuki | 348/2 |
| 5,793,438 A | 8/1998 | Bedard | |
| 5,805,204 A | 9/1998 | Thompson et al. | |
| 5,812,123 A | 9/1998 | Rowe et al. | |
| 5,819,036 A | 10/1998 | Adams et al. | |
| 5,822,123 A | 10/1998 | Davis et al. | |
| 5,844,620 A | 12/1998 | Coleman et al. | |
| 5,850,218 A | 12/1998 | LaJoie et al. | |
| 5,870,150 A | 2/1999 | Yuen | |
| 5,880,792 A | 3/1999 | Ward et al. | |
| 5,881,051 A | 3/1999 | Arrowood et al. | |
| 5,886,746 A | 3/1999 | Yuen et al. | |
| 5,913,039 A | 6/1999 | Nakamura et al. | 395/200.61 |
| 5,943,047 A | 8/1999 | Suzuki | 345/327 |
| 5,951,639 A | 9/1999 | MacInnis | 709/217 |
| 5,977,962 A | 11/1999 | Chapman et al. | |
| 6,002,393 A | 12/1999 | Hite et al. | |
| 6,005,562 A | 12/1999 | Shiga et al. | |
| 6,005,597 A | 12/1999 | Barrett et al. | |
| 6,006,265 A | 12/1999 | Rangan et al. | |
| 6,014,184 A | 1/2000 | Knee et al. | |
| 6,020,929 A | 2/2000 | Marshall et al. | |
| 6,026,368 A | 2/2000 | Brown et al. | 705/14 |
| 6,034,678 A | 3/2000 | Hoarty et al. | |
| 6,052,145 A | 4/2000 | Macrae et al. | |
| 6,055,573 A | 4/2000 | Gardenswartz et al. | |
| 6,064,377 A | 5/2000 | Hoarty et al. | |
| 6,084,628 A | 7/2000 | Sawyer | |
| 6,100,883 A | 8/2000 | Hoarty | |
| 6,100,917 A | 8/2000 | Tsutsui et al. | |
| 6,119,098 A | 9/2000 | Guyot et al. | |
| 6,169,570 B1 | 1/2001 | Suzuki | 348/13 |
| 6,182,050 B1 | 1/2001 | Ballard | 705/14 |
| 6,219,704 B1 | 4/2001 | Kim et al. | 709/224 |
| 6,253,208 B1 | 6/2001 | Wittgreffe et al. | 707/104 |
| 6,308,214 B1 * | 10/2001 | Plevyak et al. | 709/233 |
| 6,330,719 B1 | 12/2001 | Zigmond et al. | |
| 6,502,076 B1 * | 12/2002 | Smith | 705/14 |
| 6,507,562 B1 * | 1/2003 | Kadansky et al. | 370/216 |
| 6,560,777 B2 * | 5/2003 | Blackketter et al. | 725/110 |
| 6,574,793 B1 | 6/2003 | Ngo et al. | |
| 6,614,987 B1 | 9/2003 | Ismail et al. | |
| 6,637,029 B1 | 10/2003 | Maissel et al. | |
| 6,718,551 B1 | 4/2004 | Swix et al. | |
| 6,738,978 B1 | 5/2004 | Hendricks et al. | |
| 6,745,237 B1 * | 6/2004 | Garrity et al. | 709/219 |
| 6,748,447 B1 * | 6/2004 | Basani et al. | 709/244 |
| 6,771,317 B2 * | 8/2004 | Ellis et al. | 348/569 |
| 6,813,776 B2 * | 11/2004 | Chernock et al. | 725/58 |
| 6,845,396 B1 * | 1/2005 | Kanojia et al. | 709/224 |
| 2002/0059094 A1 | 5/2002 | Hosea et al. | |
| 2002/0152117 A1 | 10/2002 | Cristofalo et al. | |
| 2003/0007481 A1 | 1/2003 | Wada et al. | |
| 2003/0020744 A1 | 1/2003 | Ellis et al. | |
| 2003/0206554 A1 | 11/2003 | Dillon | |
| 2004/0044677 A1 | 3/2004 | Huper-Graff et al. | |
| 2004/0064570 A1 | 4/2004 | Theron | |
| 2005/0149964 A1 | 7/2005 | Thomas et al. | |

FOREIGN PATENT DOCUMENTS

| | | |
|---|---|---|
| WO | WO 99/52285 | 10/1999 |
| WO | WO 01/22731 A1 | 3/2001 |

* cited by examiner

| PACKAGE DATA TRANSMISSION PARAMETERS ||
|---|---|
| COLUMN | DESCRIPTION |
| ID(PK) | Uniquely identifies the package. |
| PACKAGE_START_TIME | The time the first contained promotion is active. This column is updated each time a promotion is added to the package, using the START_TIME from the earliest promotion. |
| PACKAGE_EXPIRE_TIME | The time the first contained promotion expires. This value is computed by adding the last promotion's START_TIME to its DURATION. |
| INFO_TX_TIME | Scheduled time for distributing the transmission schedule. Computed by the scheduler by subtracting from DATA_TX_TIME the INFO_TX_LEADTIME from the associated transmission group. |
| DATA_TX_TIME | Scheduled start time for the multicast. Computed by the scheduler by subtracting from the earliest promotion activation time the DATA_TX_LEADTIME value from the associated transmission group. |
| DATA_TX_DURATION | Total time (in msec) of the transmission. Computed using an algorithm that uses the total number of bytes to be sent, along with the transmission group's DATA_TX_RATE and DATA_TX_CYCLE_COUNT values as input parameters. |
| DATA_TX_ADDRESS | IP multicast address to be used to send the package. The scheduler uses an internal API call which retrieves this value using a round-robin scheme layered over configured address information. |
| DATA_TX_PORT | TCP port number to be used to send the package. The scheduler uses a round-robin scheme layered over configured port information. |
| DATA_TX_RATE | |
| TRANSMISSION_GROUP_ID | Identifies the transmission group to receive the package. The scheduler determines this value by mapping promotion group identifiers into transmission group identifiers when a promotion is schedule.<br><br>All of the promotions within a single package share a command transmission group identifier. When a promotion is associated with more than one transmission groups, a separate package is created in the system for each group. |

FIG. 3B

| | |
|---|---|
| SCHEDULE_TX_SENT | Character encoded Boolean set to TRUE after the transmission schedule has been sent to the devices.<br><br>Note: once the device has been notified of the schedule the package cannot be altered by the normal process. Changing a package after the schedule has been sent means that schedule needs to regenerated and transmitted to the devices. |
| SCHEDULE_TX_RESULT | HyperGate result code containing the result of the schedule transmission. |
| DATA_TX_SENT | Character encoded Boolean set to TRUE after the multicast has been successfully accomplished. |
| DATA_TX_RESULT | HyperGate result code containing the result of the data transmission. |
| TIME_CREATED | Time the entry was added to the table. |
| TIME_MODIFIED | Last time the record was updated. |

FIG. 3C

| TRANSMISSION GROUP PARAMETERS ||
|---|---|
| COLUMN | DESCRIPTION |
| ID(PK) | Identifies the transmission group. |
| NAME | Name of the transmission group. Must be unique. |
| DESCRIPTION | Description field. |
| INFO_TX_LEADTIME | Earliest delta time in advance of a promotion data transmission that the schedule information should be sent to the device. |
| DATA_TX_LEADTIME | Earliest delta time in advance of a promotion that promotion data should be sent to the device.<br><br>This value is also used to compute package transmission times by subtracting this value from the earliest promotion activation time for a given promotion package. |
| DATA_TX_RATE | Sets the number of packets sent per minute to prevent device CPUs from getting packet overflow. |
| DATA_TX_CYCLE_COUNT | Total number of times the content of the multicast is repeated, in order to minimize the chances of loss or missed packets. The default value for new groups is one. |
| NOMINAL_STORAGE_LIFETIME | The average expected lifetime for a promotion file on the device. The scheduler uses this value in conjunction with the transmission lead-time to determine the order in which promotions are sent to the devices in the group. |
| MIN_STORAGE_THRESHOLD | Minimum amount of (promotion) storage a device must have to be a member of this group.<br><br>Valid values range from zero (no upper limit) to the maximum amount of storage on the device. |
| MAX_STORAGE_THRESHOLD | Maximum amount of (promotion) storage a device must have for group membership.<br><br>Valid values range from zero (no upper limit) to the maximum amount of storage on the device. |
| PACKAGE_SIZE_LIMIT | Maximum number of bytes that can be sent to the device during a single multicast transmission. This value will always be less than or equal to the MAX_STORAGE_THRESHOLD value.<br><br>For most devices, the value will be less than the MAX_STORAGE_THRESHOLD since it is assumed that not all of the available storage on the device will be necessarily available for promotions. The promotion manager relies on the assumption of a constant fraction being available for the purposes of scheduling. |

FIG. 3D

| Local Moniker | |
|---|---|
| Parameter | Meaning |
| MonikerType | Either HG_FILE_PATH or HG_REGISTRY_SUBKEY |
| Name | Either the file path or the registry subkey |

FIG. 6A

| Multicast Remote Moniker | |
|---|---|
| Parameter | Meaning |
| ObjectGUID | This identifies the data that follows as a multicast remote moniker, version 1.0 |
| ModuleID | The bulk server correlates its binaries using the module ID. The module ID is used to choose the binary to send or receive. |
| Start time | Time that the multicast transmission of the data begins. |
| Duration | Length of time that the multicast runs. |
| Address | IP multicast runs. |
| Port | Port # for multicast. |

FIG. 6B

| TRANSMISSION REQUEST | |
|---|---|
| Parameter | Meaning |
| HG_PROP_REQUEST_TYPE | HG_BULKMGR_SCHEDULE_MULTICAST |
| HG_PROP_REQUEST_ID | Used to correlate request with responses |
| HG_PROP_QUEUE_NAME | HG_BULKSERVER_QUEUE_NAME |
| HG_PROP_RESPONSE_QUEUE | The responses are sent to this queue |
| HG_PROP_SENDER_ID | The responses are sent to this machine |
| HG_PROP_BULKMGR_IP_ADDRESS | Internet address for multicast |
| HG_PROP_BULKMGR_PORT | Port # used to send multicast |
| HG_PROP_BULKMGR_NETWORK_ID | The network to multicast over. This defaults to the value in the property collection. |
| HG_PROP_BULKMGR_PACKET_FREQUENCY | # of ticks per packet transmission |
| HG_PROP_BULKMGR_START_TIME | Time to start the transmission |
| HG_PROP_BULKMGR_DURATION | Length of the transmission |
| HG_ModuleID1 | Unique identifier for first promotion |
| HG_ModuleID2 | Unique identifier for second promotion |
| ... | ... |
| HG_ModuleIDN | Unique identifier for n'th promotion |

FIG. 9

T_APPLICATION

| GUID: RAW(16) NOT NULL |
|---|
| NAME: VARCHAR2(50) NULL
MODULE_ID: RAW(16) NOT NULL (FK)
LOCAL_MONIKER: VARCHAR2(100) NOT NULL
MODULE_TYPE: NUMBER(5) NOT NULL
URL: VARCHAR2(256) NULL
ENTRY: VARCHAR2(256) NULL
RUN_FLAGS: NUMBER(5) NULL
START_PRIORITY: NUMBER(5) NULL
STOP_PRIORITY: NUMBER(5) NULL
MODULE_QUEUENAME: VARCHAR2(32) NULL
DRIVER_PREFIX: VARCHAR2(20) NULL
DRIVER_CTRL: NUMBER(5) NULL
START_DELAY: NUMBER(5) NULL
SHUTDOWN_DELAY: NUMBER(5) NULL
DEPLOYED: VARCHAR2(1) NOT NULL
DRIVER_INFO: NUMBER(10) NULL |

TO
T_PROMOTION
FIG. 10C

T_DEVICE

| ID: NUMBER(10) NOT NULL |
|---|
| TRANSMISSION_GROUP_ID: NUMBER(10) NULL (FK)
CONNECT_STATE: NUMBER(3) NOT NULL
ADDRESS: NUMBER(10) NULL
ACCOUNT_ID: NUMBER(10) NULL (FK)
NAME: VARCHAR2(50) NULL
LAST_CONNECT_TIME: DATE NOT NULL
LAST_CONNECT_ATTEMPT: DATE NOT NULL
PORT: NUMBER(5) NULL
CHAN_HIST_XFER_TIME: DATE NOT NULL
CONNECT_OID: NUMBER(10) NOT NULL
MAC_ADDRESS: NUMBER(20) NULL
DEVICE_GUID: RAW(16) NULL
NETWORK_ID: NUMBER(5) NULL (FK)
ROUTER_ID: NUMBER(5) NULL (FK)
LCM_ID: NUMBER(10) NULL (FK)
SITE: VARCHAR2(32) NULL
HEAD_END: VARCHAR2(32) NULL
HUB: VARCHAR2(32) NULL
NODE: VARCHAR2(32) NULL
TAP: VARCHAR2(32) NULL |

TO
T_PROMOTION_PACKAGE_REL
FIG. 10C

TO
T_PROMOTION_DEVICE_REL
FIG. 10B

TO
T_DEVICE_REQUEST_LOG
FIG. 10E

TO
V_PROMO_DETAIL
FIG. 10E

T_DEVICE_SET_DEVICE_REL

| DEVICE_ID: NUMBER(10) NOT NULL (FK)
DEVICE_SET_ID: NUMBER(10) NOT NULL (FK) |
|---|

TO
T_DEVICE_SET
FIG. 10B

TO T_NETWORK FIG. 10B

FIG. 10A

GENERATING SCHEDULES FOR SYNCHRONIZING BULK DATA TRANSFERS TO END NODE DEVICES IN A MULTIMEDIA NETWORK

RELATED APPLICATION

This application claims the benefit of U.S. Provisional Application No. 60/253,441, filed on Nov. 28, 2000. The entire teachings of the above application is incorporated herein by reference.

BACKGROUND OF THE INVENTION

At the present time, most data network devices located in the residences include some type of personal computer. Typically, these personal computers are used to connect to Internet Service Providers over dial-up connections to execute application programs such as email clients and Web browsers that utilize the global Internet to access text and graphic content. Increasingly, the demand is for multimedia content, including audio and video, to be delivered over such networks. However, the backbone architectures of purely data networks, especially those designed for use with the telephone network, were not originally designed to handle such high data rates.

The trend is towards a more ubiquitous model where the network devices in the home will be embedded systems designed for a particular function or purpose. This has already occurred to some degree. Today, for example, cable television (CATV) network set-top boxes typically have limited data communication capabilities. The main function of the data devices is to handle channel access between residential users and a head end or server on the cable TV network.

However, it is estimated that the worldwide market for Internet appliances such as digital set-top boxes and Web-connected terminals will reach $17.8 billion in 2004, and millions of such digital set-top boxes have already been deployed. Increasingly, advertisers and content providers view the cable set-top as the first platform of choice for widespread delivery of a suite of intelligent content management and distribution services.

In the future, the functionality offered by these set-top boxes or other embedded platforms, such as a game system, will be expanded. For example, they may offer Internet browsing capabilities and e-commerce serving capabilities. Moreover, it is anticipated that common-household appliances will also have network functionality, in which they will be attached to the network to automate various tasks.

SUMMARY OF THE INVENTION

Because of the extremely large numbers of network devices in such networks, efficient distribution and delivery of promotions and other digital content remains a challenge. Where the personal computer can be updated with new network drivers as the network evolves, embedded client systems remain relatively static. In addition, such networks may have hundreds of thousands, if not millions, of network devices to manage. It is evident that standard data Open Systems Inerconnection (OSI) layered network protocols, which were optimized for peer to peer communication, are not an entirely acceptable arrangement.

Consider that the digital set top box provides certain interesting functionality, such as the ability to store certain amounts of data. The set top box can thus be designed to store a multimedia computer file which represents a digitized version of a promotion. However, such a network may have hundreds of thousands, if not millions of set top boxes, to which delivery of promotions must be individually coordinated. If such a data network were built using only the standard protocols such as direct TCP/IP messaging from a central promotion server to the set top boxes, the sheer volume of message traffic needed to route the promotions to the intended destinations would quickly overload the central data server.

Promotions may be targeted to one or more device groups. A promotion/device group set relation is maintained for each promotion indicating the device groups to which each promotion should be sent. A device group corresponds to a statistically categorized group of end node devices (e.g. set top boxes) based on demographics or viewership history. A device group may be further subcategorized to include one or more transmission groups corresponding to the physical characteristics of the end node devices (e.g. hardware, memory capacity). A promotion server creates a package containing the promotion for each transmission group of the device group. If a package for a particular transmission group is already created and has sufficient available space, the promotion is simply added to the package. Therefore, a package created for a transmission group may hold promotions intended for different device groups even though not all of the promotions are targeted for the same devices. A schedule process then analyzes a set of packages, building a schedule for each end node device, ultimately assigning promotion identification, transmission times, port numbers, and/or multicast IP addresses for specific device groups. Schedule messages are then send out individually to each end node, so that the expected broadcast (multicast) message time, port, and IP address information is known by each device for each of the promotions which are intended for it to receive. The packaged promotions are then sent via bulk data transmission to the end nodes which is initiated by the generation and delivery of transmission requests to bulk data servers on the network.

BRIEF DESCRIPTION OF THE DRAWINGS

FIGS. 3B and 3C is a table containing typical data transmission parameters specified by a package according to one embodiment.

FIG. 3D is a table containing parameters specified by a transmission group according to one embodiment.

FIG. 6A is a table identifying the parameters of a local moniker according to one embodiment.

FIG. 6B is a table identifying the parameters of a remote moniker according to one embodiment.

FIG. 9 is a table illustrating the parameters of a transmission request according to one embodiment.

FIGS. 10A-10F is a diagram illustrating the organization of tables of record within the database according to one embodiment.

Figure 1:
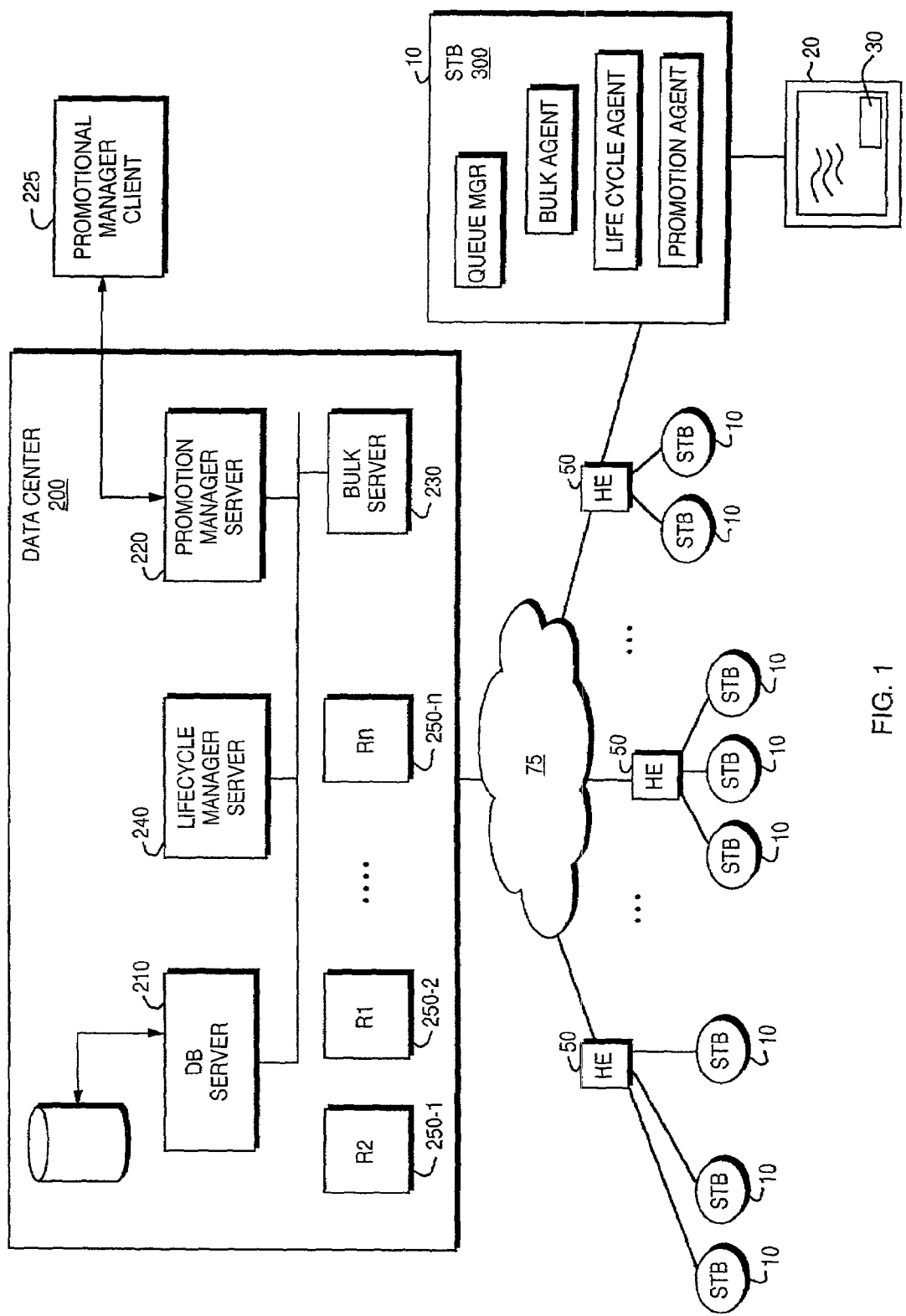
FIG. 1 is a diagram illustrating a multimedia content delivery system for distributing content such as targeted promotions according to one embodiment of the present invention.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

Turning attention now to the drawings, FIG. 1 illustrates a multimedia content delivery system for distributing content such as targeted promotions according to one embodiment of the present invention. Embodiments of the multimedia content delivery system allow advertisers and service providers the ability to effectively utilize a multimedia network for targeting promotions or other content at consumers through network devices. In particular, the system facilitates the targeting of promotions in varying degrees of granularity from individuals to entire market segments. The system includes a large number of set top boxes or network devices 10 connected to respective video displays 20, such as televisions.

Figure 2:
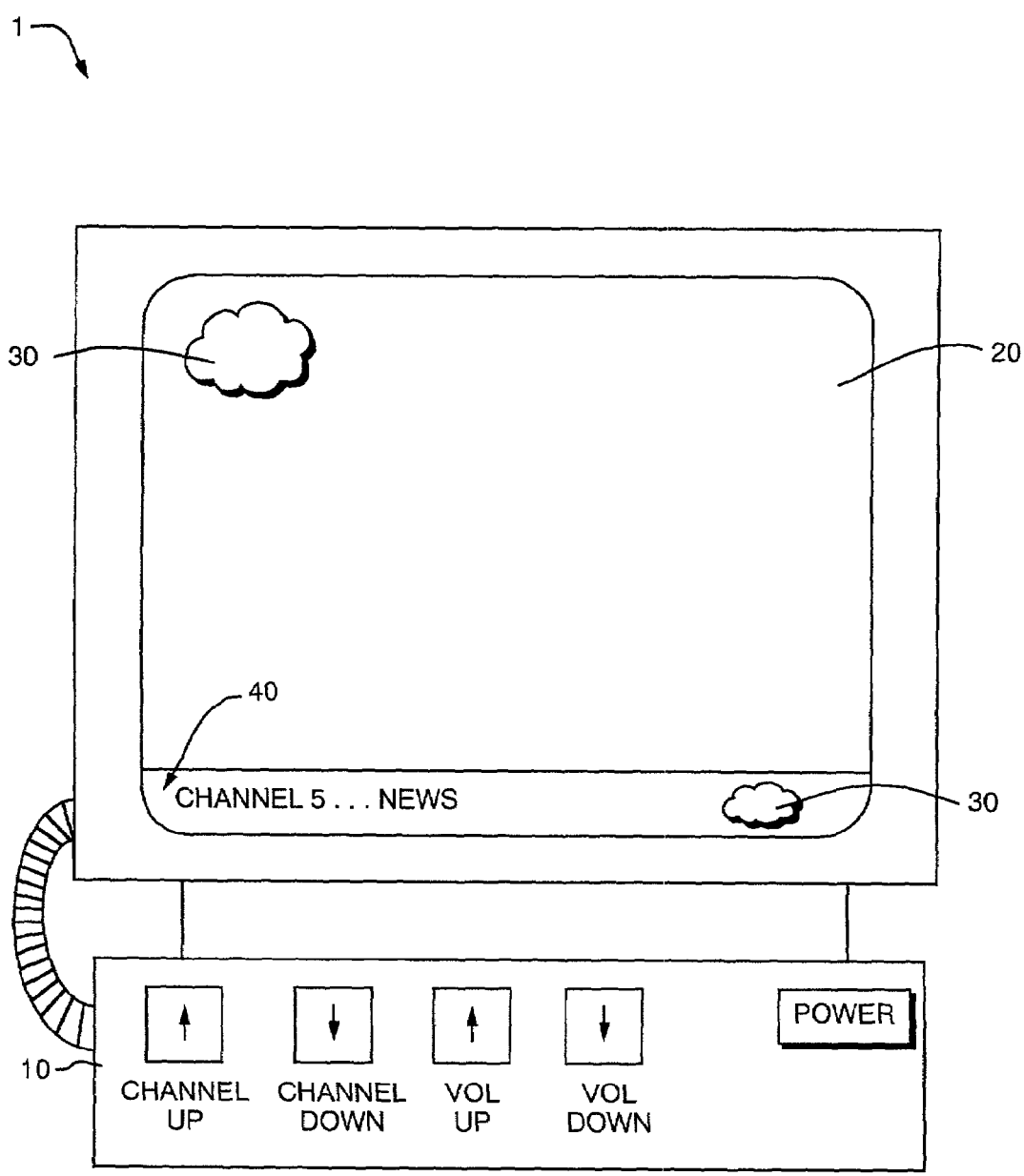
FIG. 2 is a diagram of a set top box/video display system displaying active promotions according to one embodiment.

Promotions 30 typically include promotional content that may be presented in various multimedia formats including standard audio visual clips, but also computer graphics, icons, or Hypertext Markup Language (HTML) content. Promotions are used to advertise goods and services, promote events, or present other commercial or non-commercial information. One or more promotions 30 may be simultaneously active within the video displays 20 and may be displayed in different ways. For example, in FIG. 2, promotions 30 are presented on electronic program guides, channel information bars 40, or overlaying video broadcast programming. Some active promotions that may be displayed on digital set top boxes allow user interaction such as linking to e-commerce web-sites via hyperlink connections or direct communication to a promotion server subsystem to obtain additional software, such as device drivers, video games, or other application software.

Referring back to FIG. 1, the multimedia content delivery system also includes a promotion server subsystem 200 located at a data center and a promotion agent subsystem 300 embedded within each of the network devices. The promotion server subsystem 200 and the promotion agent subsystems 300 communicate with each other through a combination of application-level messaging and serialized bulk data transmissions.

The promotion server subsystem 200 periodically collects viewer usage data from the promotion agent subsystem 300 of each of the multimedia content viewing devices to generate viewership profiles. In television networks, the data collected by the promotion server subsystem 200 may include tuner data (i.e., a history of channels watched) and responses to past promotions. This history is kept on a relatively fine time scale, such as five seconds. In this way, it can be determined how long a particular promotion was deployed, or even which portions of a promotion or video program were viewed.

Regarding promotion delivery, the promotion server subsystem 200 includes a database server 210, a promotion manager server 220, one or more bulk data servers 230, a promotion manager client 240, a life-cycle manager server 240, and a bank of routers 250-1, 250-2, . . . , 250-$n$. These components are typically located at a central location in the multimedia network at a data center, at a head end, or divided between the two depending on the density and population of devices. It should be understood that these components may share physical platforms or be distributed across multiple machines located at different places in the network. For scalability reasons, a promotion scheduling process in the promotion manager server 220 may be separated from a function which is responsible for delivering promotion packages to the network devices 10. The delivery function may be instantiated on multiple machines, for example, to provide better scalability, such as having one bulk data server per head end in the network. The life cycle manager 240 may also be instantiated separately for each router 250.

The routers 250 communicate with the network devices 10 through a data network 75 which may itself include a further hierarchy of routers and bulk servers (not shown in FIG. 1). Ultimately, each of the network devices is connected to the network 75 through a head end location 50. In a typical cable television network, there may be many thousands of network devices connected to a particular head end, and there may be many thousands of head ends 50.

To determine how to deliver targeted promotions to the network devices, the life-cycle manager server 240 of the promotion server subsystem 200 first generates viewership profiles for each of the multimedia content viewing devices from the collected data using a variety of statistical models. The viewership profiles are then used to associate groups of network devices with a given target promotion.

Promotion groups are collections of multimedia content viewing devices whose individual viewership profiles match membership criteria describing a particular demographic or viewership history. For example, a promotion group may be demographically based, (i.e., married women in their 30's with more than one school age child and a household income of at least $100,000), or based on viewership history, (i.e., tends to watch the Golf Channel on Sunday afternoon). Therefore, the promotion server subsystem 200 is adaptable to changes in viewer usage or viewership patterns by making adjustments to promotion groups. Viewership profiles and promotion groups are described in more detail in U.S. Patent Application Attorney Docket Number 2657.2003-000, entitled "Using Viewership Profiles to Target Advertisements" filed on the same date herewith.

Promotions are then scheduled for delivery to specific promotion groups. A promotion is scheduled for delivery to a promotion group by an advertiser or service provider entering a scheduling request for a promotion such as via a promotion manager interface client 225. As promotions are scheduled, the promotion manager server 220 adds or removes promotion groups and/or scheduling information to promotions. This causes the creation or modification promotion delivery packages via stored data functions or procedures in the database 210. Later, the package information is read from the database 210 and used to create customized transmission schedules that specify when and how each of the network devices 10 is to receive it.

The promotion agent subsystem 300 embedded in each of the network devices 10 includes a promotion agent 310 and a bulk data agent 320. Upon receipt of the transmission schedule messages, the promotion agent 310 processes each schedule entry forwarding promotion download requests to the bulk data agent 320 to receive each promotion identified in the transmission schedule. The bulk data agent 320 handles the reception of the promotions from the scheduled data transmission as specified in the promotion download requests. For example, in one embodiment, the bulk data agent 320 tunes into a multicast data transmission stream at a specified time and channel or network address specified in the transmission schedule.

To initiate a transmission of promotion packages, the promotion manager server 220 extracts a set of promotion packages from the database 210 and converts each into a transmission request that is sent to one or more of the bulk data servers 230. The bulk data server 230 fetches the promotions from the database 210 that are identified in the transmission request message, and transmits them via multicast or broadcast transmission. The decision to broadcast or multicasts depends on which is supported between the head end and the capabilities of the end node devices.

Once the promotions have been successfully delivered, the promotions are activated at the network viewing devices as specified in promotion control data of the transmission schedules. Promotion activation may be event, time, or channel driven.

Packaging Promotions for Transmission Groups

Promotions may be scheduled for promotion groups that include diverse types of end node devices. For example, a promotion group may include devices that are functionally different, such as television set top boxes and Internet video phones. Even functionally similar types of devices (e.g., set top boxes) may differ with respect to certain physical and functional device attributes. Such attributes may include data storage capacity and the ability to receive multicast transmissions using standard data protocols, such as Transmission Control Protocol or Universal Data Protocol over Internet Protocol (TCP/IP or UDP/IP) networks. Device attributes have a direct effect on the manner in which promotions and other content are actually delivered to devices of targeted promotion groups. For example, devices with less data storage capacity are not able to cache as many promotions as devices with more storage capacity. The promotion server subsystem 200 adapts the delivery of promotions to the attributes of different device types within a promotion group through the use of packages.

Figure 3A:
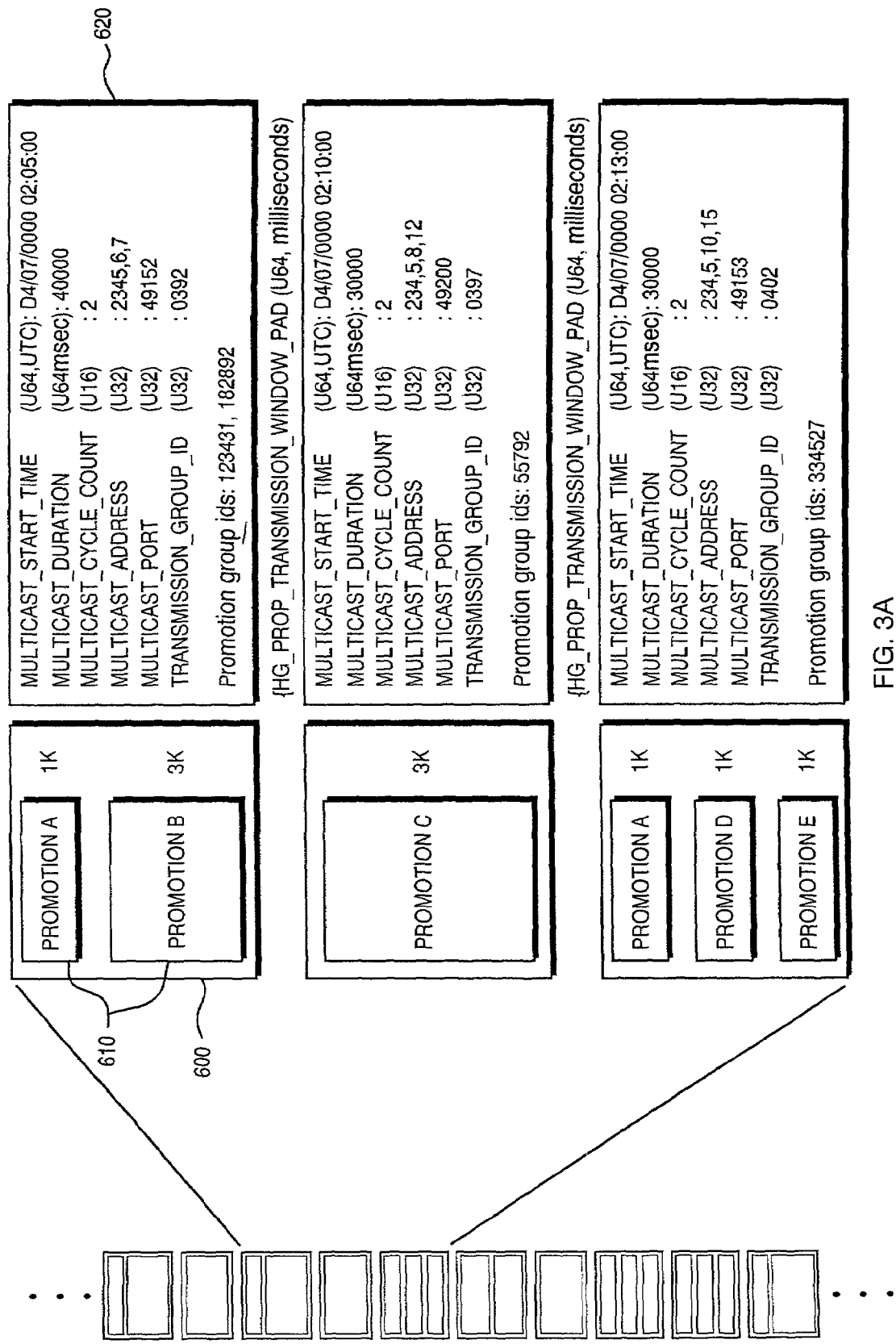
FIG. 3A is a diagram illustrating a set of packages according to one embodiment.

FIG. 3A is a diagram illustrating a set of packages according to one embodiment. A package is a data object 600 containing a set of promotions 610 and data transmission parameters 620 that specify the time and/or manner of delivery for a set of promotions to a particular transmission group. Transmission groups are sets of end node devices sharing common device attributes, such as storage and resource limitations. For example, set top boxes of a particular model number may be considered to be part of the same transmission group. Devices may be initially assigned to a transmission group manually, or automatically, during an automated registration process in which device attributes are discovered.

FIGS. 3B and 3C is a table containing typical data transmission parameters specified by a package according to one embodiment. Such parameters include data rates, data transmission times, and routing addresses, such multicast or broadcast port addresses. Furthermore, a package includes a TRANSMISSION_GROUP_ID parameter that identifies the transmission group which is to receive the package. FIG. 3D is a table containing parameters specified by a transmission group according to one embodiment. The parameters of a transmission group add to or affect the data transmission parameters of the package. For example, the size of a package is determined by the maximum package size parameter of a transmission group.

When a promotion is scheduled, the scheduling process determines TRANSMISSION_GROUP_ID by mapping promotion group identifiers into transmission group identifiers. In the preferred embodiment, all of the promotions within a single package share a common transmission group identifier. When a promotion is associated with more than one transmission group, a separate package is created in the system for each group.

Figure 3E:
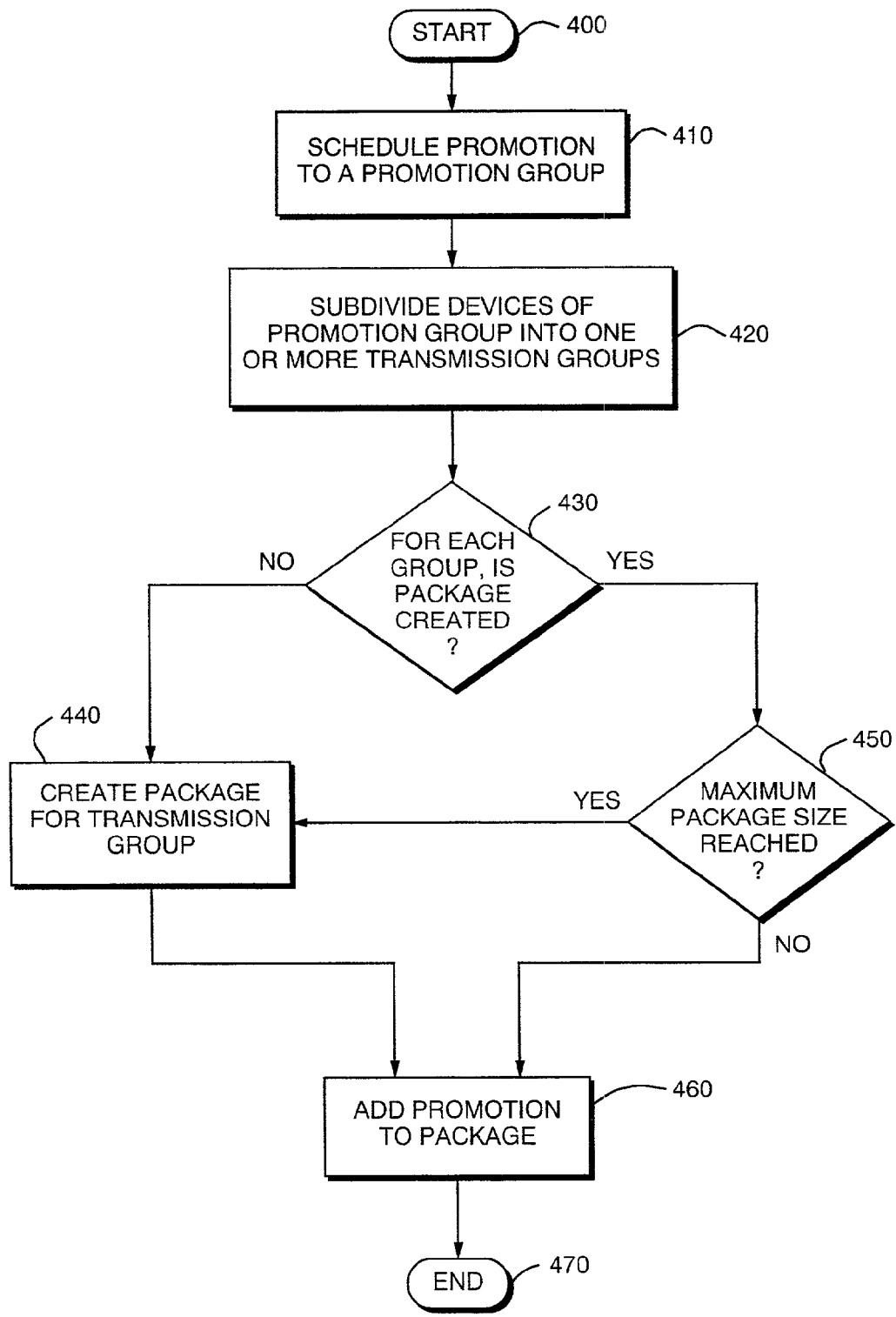
FIG. 3E is a flow diagram illustrating a process for packaging promotions for transmission groups according to one embodiment.

FIG. 3E is a flow diagram illustrating a process for packaging promotions for transmission groups according to one embodiment.

In step 410, a promotion is scheduled for delivery to one or more promotion groups where each of the promotion groups includes a set of end node devices. In particular, an advertiser or service provider enters a promotion schedule request into the promotion server subsystem 200 through the promotion manager client 225. In one embodiment, the promotion schedule request identifies a promotion, a recipient of the promotion (i.e. promotion group), as well as promotion scheduling information (e.g., channel time slot information containing start times, trigger events, or other such criteria for promotion activation).

The promotion manager server 220, in turn, places database function calls that add the promotion, recipients, and scheduling information to the database 210. As an indirect result of the promotion manager server 220 adding/removing recipients to promotions and adding/removing scheduling information for promotions, packages are created or modified. According to one embodiment, the creation and modification of packages is handled by a set of stored database procedures internal to the database 210 starting at step 420.

Figure 3F:
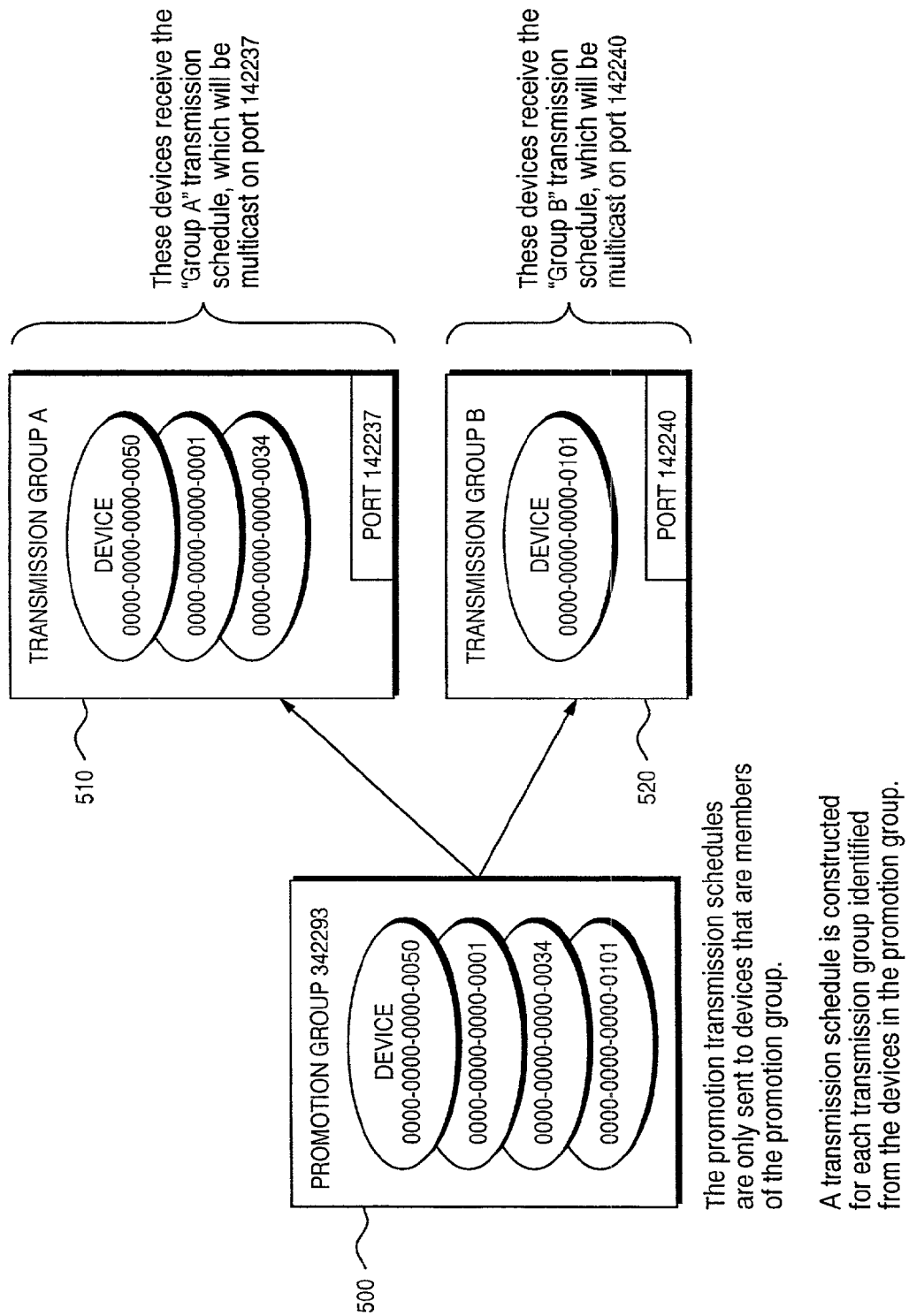
FIG. 3F is a diagram illustrating one way in which devices may be mapped from their a promotion group into transmission groups.

In step 420, the set of end node devices included in the promotion group is subdivided into one or more transmission groups. According to one embodiment, the promotion group is resolved into transmission groups by an internal database query resulting in a list of unique transmission group identifiers corresponding to the various types of end node devices within the promotion group. FIG. 3F is a diagram illustrating one way in which devices may be mapped from their promotion group into transmission groups. Each of the resulting transmission groups 510 and 520 includes a mutually exclusive set of devices from the promotion group. Packages then must be created and/or appended to for each of the transmission groups which is to receive the promotion.

Referring back to FIG. 3E, a determination is made whether or not a package has been created for a transmission group in step 430. According to one embodiment, this involves an internal database query for a package indexed by the unique identifier for the transmission group.

If there is no package associated with a transmission group, a new package is created for the transmission group in step 440. The creation of a package involves creating a new package record within the database 210. The data transmission parameters of the package record illustrated in FIGS. 3B and 3C are adapted to the device attributes of the transmission group. The record is maintained in the database 210 within a table of other package records.

In more detail regarding adapting packages to transmission groups, one attribute of network devices of the same transmission group may include data storage capacity. The data storage capacity may be an expected amount or percentage of available cache memory in the set top box. Alternatively, the data storage capacity may be an expected amount or percentage of data storage dedicated solely for caching promotions. Network providers in cable networks typically restrict data storage available for dedicated functionality, such as promotion caching.

Accordingly, the package may be adapted with a maximum package size less than or equal to the data storage capacity available for the specific end node devices which are members of the present transmission group. The maximum package size, therefore, limits the number and size of promotions that can be delivered to a transmission group. The maximum package size may be different among packages for transmission groups ranging from small to large package sizes. The maximum package size ensures that an optimal number and size of promotions are delivered to devices within a transmission group.

In another preferred embodiment, the common device attributes accommodated by the package may also include data processor speed. Faster data processors are able to handle higher data transmission rates as opposed to slower processors. A package may be adapted to accommodate the data processor speed for a transmission group by specifying an appropriate data transmission rate, which throttles the rate at which data is transmitted to devices so as not to cause packet overrun on the embedded client. Data overrun typically occurs when a device data processor cannot handle the amount of data being received from the network. The data transmission rate is the number of ticks per network packet during transmission. A network packet is about 640 bytes and a tick is approximately $1\times10^{-7}$ seconds.

Referring to step 450, if a package is already created for a transmission group, the promotion manager server 220 determines whether there is sufficient space to add the scheduled promotion based on its maximum package size. Promotions are added to each package unless the maximum package size would be surpassed. Therefore, if there is insufficient space for the addition of the promotion, a new package is created for the transmission group as specified in step 440.

Once a package is either created or located within the database 210 having sufficient space, the promotion is added to the package in step 460. Promotions may be added to packages containing promotions for different promotion groups. In one embodiment, promotions are added to packages by creating a record in the database 210 that correlates a promotion identifier with a package identifier and storing the record in a corresponding table entry.

Precasting Promotions in a Multimedia Network

In addition to specifying the manner of transmitting promotion packages, packages may also specify the timing of promotion delivery to transmission groups. As illustrated in FIG. 3B, each package specifies a package start time (i.e., PACKAGE_START_TIME) corresponding to the earliest promotion start time for its set of promotions. As promotions are added to a package, the package start time is updated using the start time of the earliest promotion in the package.

According to a preferred embodiment of the present invention, a package of promotions is sent in advance of, or "precast" to a transmission group at a data transmission time which is prior to the package start time to ensure that the promotions will be activated as scheduled.

Optimally, the data transmission time should be far in advance of the package start times, particularly at a time of low network bandwidth utilization such as in the early pre-dawn hours of the day. However, due to certain device constraints, in particular data storage capacity, packages destined for transmission groups having low data storage capacity must be delivered closer to the package start time. Otherwise, there is a risk that promotions from subsequent packages may overwrite promotions that were previously cached but have not yet expired.

The promotion delivery system therefore optimally precasts packages of promotions by accounting for the data storage capacity and other common device attributes of a transmission group. The process results in packages of promotions being transmitted at appropriate data transmission times preventing data loss and utilizing the available network bandwidth more efficiently.

In brief overview, the process for determining the data transmission time for a package of promotions involves (1) determining a package transmission lead-time from the common device attributes of a transmission group; (2) determining a data transmission time by subtracting the package transmission lead-time from the package start time; and (3) initiating the transmission of the promotion package to the transmission group at the data transmission time.

Figure 4A:
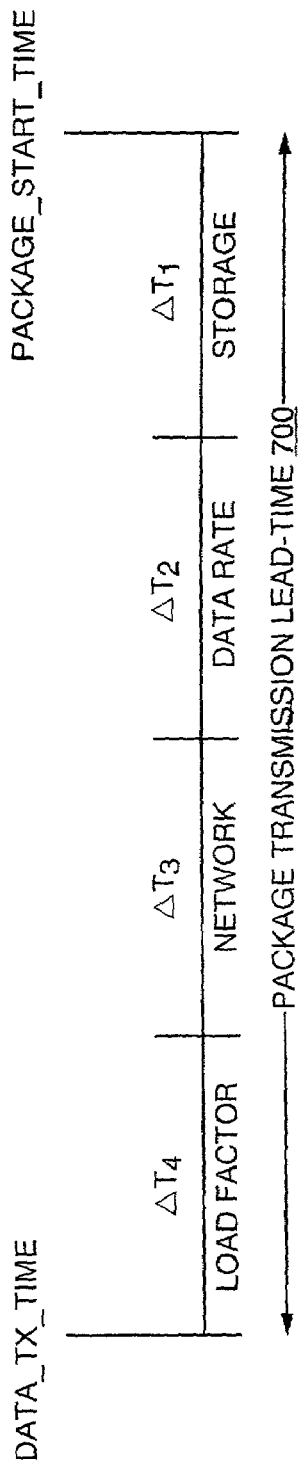
FIG. 4A is a time line diagram illustrating a promotion transmission lead-time with its constituent lead-times according to one embodiment.

FIG. 4A is a time line diagram illustrating considerations for determining a package transmission lead-time with its constituent lead-times according to one embodiment. Each of the constituent lead-times relates to a common device attribute of the transmission group to which the package corresponds. The package transmission lead-time 700 typically includes a storage dependent lead-time $\Delta T_1$, a data transit lead-time $\Delta T_2$, a network latency lead-time $\Delta T_3$, and a load factor lead-time $\Delta T_4$.

According to one embodiment, the data storage capacity of a transmission group is a device attribute for determining the package transmission lead-time. Device storage capacity is accounted for in a storage-dependent lead-time $\Delta T_1$ which is a variable time period directly related to the data storage capacity of a transmission group.

Transmission groups having low storage capacity need promotion content cached in its devices closer to the time of promotion activation. Otherwise, there is a risk that the promotion content may be overwritten by promotions from subsequent packages, prior to the scheduled time for activation of the stored promotion. Therefore, if the device data storage capacity is low, the storage-dependent lead-time $\Delta T_1$ is relatively short, being closer to the package start time. Short storage-dependent lead-times typically range from seconds to minutes.

Conversely, transmission groups having high data storage capacity have the necessary cache resources to store more promotions. This allows promotion content to be received at an earlier time when expected network bandwidth utilization is low. Therefore, the storage-dependent dependent lead-time $\Delta T_1$ is relatively long for the transmission groups which have high data storage capacity, optimally falling within a period of expected low bandwidth utilization of the multimedia network. Long storage-dependent lead-times typically range from hours to days. According to one embodiment, the storage-dependent lead-time $\Delta T_1$ is stored in the database 210 as a transmission group parameter (i.e. DATA_TX_LEADTIME) of FIG. 3D.

By way of example, assume that a set of promotions is targeted for a promotion group having two transmission groups. One group corresponds to devices having a low storage capacity attribute, while the other is associated with a high storage capacity attribute. Packages are created containing the promotions and having the same package start time for each group. However, the package of promotions for the transmission group having a high storage capacity would have an earlier data transmission time (e.g., one day in advance of package start time at 3:00 AM) as opposed to the transmission group having less storage capacity (e.g., 5 minutes prior to package start time). Thus, by precasting the packages at different data transmission times, allocation of network bandwidth is more efficiently distributed for promotion delivery among the transmission groups.

According to another embodiment, the device processor speed of a transmission group is another device attribute for determining the package transmission lead-time 700. Since device processor speeds vary between manufacturers and device models, the processor speed of a transmission group is accommodated by a data transmission rate for a promotion package. Accordingly, the data transit lead-time $\Delta T_2$ accounts for the time period necessary to transmit the entire package of promotions to a transmission group. The data transit lead-time $\Delta T_2$ is calculated by multiplying the (1) inverse of the data transmission rate, (2) sum total of the set of promotion sizes, and (3) cycle count. The cycle count is the number of times the data transmission is repeated. Repetition allows devices that started to receive promotions late to retrieve what it may have previously missed.

According to a further embodiment, network latency is a common device attribute for determining the package transmission lead-time 700. Although devices may be similar in terms of manufacturer and model, the network topology, to which such devices are connected, can affect the timing of promotion delivery. Where network latency is a factor, such devices are typically grouped together in a separate transmission group statically accounting for such network latency delays.

For example, a transmission group of devices that are connected to a satellite network are typically slower than a transmission group of devices connected to a cable television network. A network latency lead-time $\Delta T_3$ is a variable time period that may be directly related to the network delays attributed to the particular network topology for a transmission group. The network latency lead-time $\Delta T_3$ is relatively long if the network latency associated with a particular network topology is typically high. Conversely, the network latency lead-time $\Delta T_3$ is relatively short if the network latency is at most nominal.

Alternatively, the network latency lead-time $\Delta T_3$ may be determined dynamically by network statistics accumulated by the promotion manager server 220. For example, as the promotion manager server 220 delivers messages to devices, it can keep track of how long it took for acknowledgment messages to be returned from devices on various subnets or head ends of the multimedia network. The network latency lead-time $\Delta T_3$ may be dynamically adjusted to account for network delays attributed to network congestion.

Another factor that determines the package transmission lead-time is the server load factor which affects the performance of the promotion manager server 220. If the load on the promotion manager server 220 causes the scheduling process to slow down, then there is a risk that the promotions may not be delivered at the specified data transmission times, particularly with transmission groups having low data storage capacity. Therefore, in order to account for the server load factor, a load factor lead-time $\Delta T_4$ is added to the package transmission lead-time 700. The load factor lead-time $\Delta T_4$ is a variable time period that adjusts to the statistics associated with server performance.

The promotion manager server 220 monitors its own performance by keeping track of how long certain tasks take to perform. For example, the promotion manager server 220 may track performance statistics relating to the processing of packages or the return of acknowledgment messages from other processes in the promotion server subsystem 200. Such statistics provide an indication of server performance.

If the statistics indicate that server performance is slow, the load factor lead-time $\Delta T_4$ is increased by an amount to account for the server delays in excess of the average data processing times. Conversely, if the statistics indicate that server performance is average or better, the load factor lead-time $\Delta T_4$ may by decreased by a nominal amount if at all.

The data transmission time is subsequently calculated by adding up the constituent lead-times of the package transmission lead-time 700 and subtracting the resulting time period from the package start time. The resulting data transmission time is the time when the multicast or broadcast transmission of promotions must start. According to one embodiment, the data transmission time is stored as a parameter, DATA_TX_TIME, of a package as illustrated in FIG. 3B In addition to determining data transmission times for promotion packages, the promotion manager server 220 determines a schedule transmission time for sending transmission schedule messages to end node devices of targeted promotion groups. Transmission schedules are used to synchronize the delivery of promotions between the promotion server subsystem 200 and devices of targeted promotion groups. The schedules typically contain information relating to the time and manner of promotion delivery and are customized for each end node device. The generation of transmission schedules and their use are discussed in more detail with reference to FIG. 5 and FIG. 7.

The schedule transmission time is a calculated time when the transmission schedules are to be delivered to the targeted end node devices. It is typically determined by subtracting a schedule transmission lead-time $\Delta T_5$ from the data transmission time for a package of promotions.

Figure 4B:
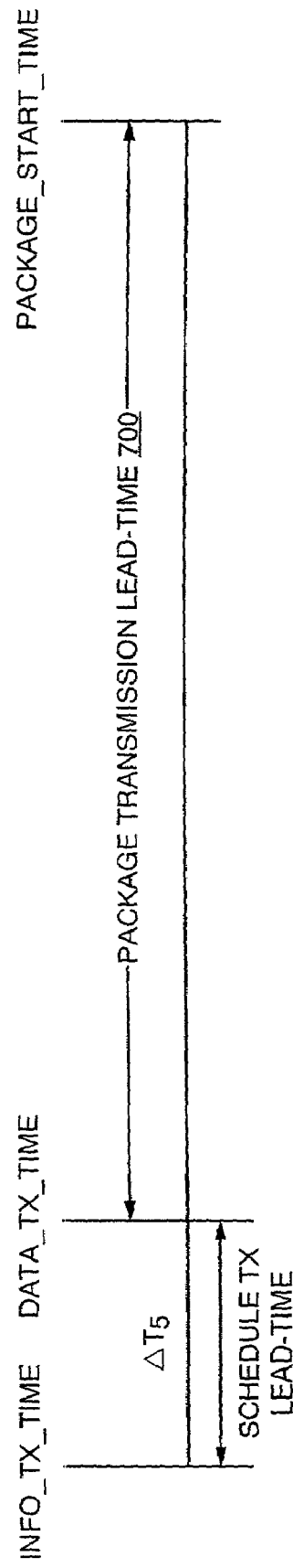
FIG. 4B is a time line diagram illustrating a schedule transmission lead-time according to one embodiment.

FIG. 4B is a time line diagram illustrating a schedule transmission lead-time according to one embodiment. The schedule transmission lead-time $\Delta T_5$ is typically a fixed time period. The fixed time period should be long enough to allow for the delivery of a schedule message to a device and for the return of an acknowledgment message back (e.g., 120 seconds). Preferably, the fixed time period should allow for multiple deliveries and acknowledgments of schedule messages prior to the data transmission time for the instances where initial delivery attempts fail. The schedule transmission time is determined by subtracting the schedule transmission lead-time $\Delta T_5$ from the data transmission time DATA_TX_TIME. According to one embodiment, the schedule transmission time is stored as a parameter, INFO_TX_TIME, of a package as illustrated in FIG. 3B As additional promotions are added or removed, affected packages are automatically adjusted, provided the transmission schedules have not been previously transmitted. Packages can only be changed manually once the transmission schedule has been sent, since any changes may involve re-transmitting the schedule to the devices.

Synchronization of Bulk Data Transfers

Once packages of promotions have been created, the promotion delivery system provides an efficient way of delivering these packages to devices of targeted promotion groups. Due to the potential large number of devices, it is not efficient to deliver promotions individually to each device. Likewise, broadcast transmissions of promotions unnecessarily interrupt devices that are not targeted for promotions in addition to those that are. Therefore, the promotion delivery system delivers promotions by synchronizing end node devices of targeted promotion groups with multicast transmissions of promotion content.

In brief overview, the process involves (1) scheduling transmissions of promotion packages for delivery across multiple media; (2) notifying devices of targeted promotion groups of the scheduled bulk data transmissions; (3) transmitting the packages of promotions via multicast or broadcast transmission; and (4) selectively receiving a subset of the promotions during the scheduled transmissions. This process is not limited solely to promotions, but can be modified to handle other types of content as well, such as software applications, drivers, and other data files.

Figure 5:
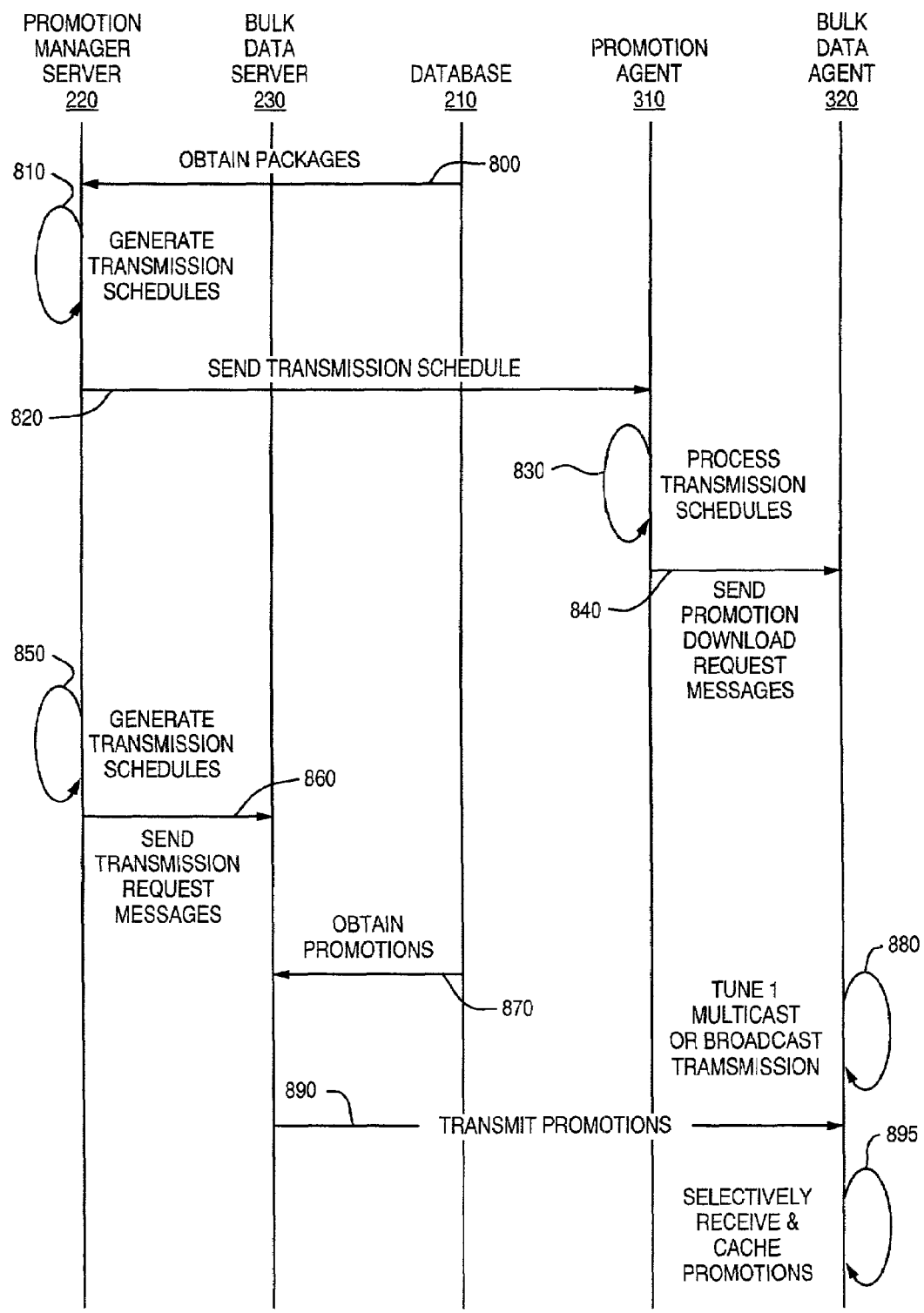
FIG. 5 is a state line diagram illustrating a process for synchronizing the delivery of promotions to end node devices according to one embodiment.

FIG. 5 is a state line diagram illustrating a process for synchronizing the delivery of promotions to end node devices according to one embodiment.

In step 800, the promotion manager server 220 obtains a set of promotion packages from the promotion database 210. Packages are selected in order according to their package start times from earliest to latest.

In step 810, the promotion manager server 220 schedules multicast transmissions of promotions by generating customized transmission schedules for each targeted end node device from the set of selected promotion packages. The transmission schedules identify the promotion content to be received, how and when the content will be delivered, and criteria for activating the promotion. The process for generating transmission schedules is discussed in more detail with respect to FIG. 7. According to one embodiment, the times specified in the transmission schedules are synchronized with a time server on the multimedia network or, in the case of television networks, may be synchronized with the broadcast television programming.

In step 820, the promotion manager server 220 notifies all devices of targeted promotion groups of the scheduled transmissions by sending the transmission schedules individually as messages to the promotion agent 310 of each of the end node devices 300. Since transmission schedules are reliably delivered as messages, the promotion manager server 220 is able to track which devices have received their schedules and those that have not.

In general, all messages, including schedule messages, are delivered over a message routing subsystem. The message routing subsystem is an application level system involving the message routers 250-*n* such that communication between the promotion server subsystem 200 and promotion agent subsystems 300 embedded within end node devices is facilitated regardless of server platform.

In step 830, the promotion agent 310 processes the transmission schedules converting them into promotion download request messages. The promotion download request messages direct the bulk data agent 320 to receive data and the manner of doing so. The payload of the promotion download request message typically contains a serialized local moniker and a serialized remote moniker.

FIG. 6A is a table identifying the parameters of a local moniker according to one embodiment. The local moniker specifies where to cache promotions in the device once the promotions are received (e.g., file path or registry subkey).

FIG. 6B is a table identifying the parameters of a remote moniker according to one embodiment. The remote moniker for a multicast transmission specifies the module identifiers which correlate with the promotion content to be received. Furthermore, multicast start times, duration of the multicast transmission, and an IP multicast address and UDP port number may be specified. Alternatively, the start time may be replaced with a trigger event initiating the reception of a multicast transmission.

In step 840, the promotion agent 310 delivers the promotion download request messages to the bulk data agent 320 which maintains the responsibility for selectively receiving subsets of promotions from multicast transmissions as specified.

In step 850, the promotion manager server 220 generates transmission requests for each of the selected promotion packages. In brief overview, a transmission request contains module identifiers that correspond to the actual promotion content being delivered as well as data transmission parameters controlling the time and/or manner in which the set of promotions are to be transmitted. Such parameters extracted from the package may include data transmission rate, multicast IP address and port number, and number of transmission repeat cycles. The generation of transmission requests is discussed in more detail with reference to FIG. 8.

In step 860, the promotion manager server 220 sends the transmission requests as messages to a bulk data server 230. In a preferred embodiment, the promotion manager server 220 may send the same transmission request to multiple bulk data servers located at the head ends of the multimedia network providing additional scalability.

In step 870, the bulk data server 230 obtains the promotions from the database 210 by the module identifiers specified in the transmission requests. Promotion content is transferred from the database 210 to a bulk data cache local to the bulk data server.

The size of the local bulk data cache varies in time based on the size and number of promotions identified in the transmission requests received from the promotion manager server 220. The amount of memory allocated for the cache increases with the number and size of promotion content identified in a transmission request. As promotion packages expire (e.g., time for promotion activation has ended), stored promotion content is flushed (e.g. deleted) from the cache and memory is deallocated from the cache; thus reducing the overall cache size.

In step 880, the bulk data agent 320 "tunes" into the multicast transmission at the specified data transmission time or in response to a specified trigger event. The bulk data agent 320 "tunes" into the multicast transmission by opening a connection to the IP multicast address and port.

In step 890, the bulk data server opens a multicast transmission sending the promotions to the IP multicast port address.

In step 895, the bulk data agent selectively receives the subset of promotions in the transmission and caches the promotions in its local device cache. In selectively receiving the promotions, the bulk data agent 320 scans the multicast data stream for the module identifiers corresponding to the subset of promotions specified in the remote monikers extracted from the promotion download request messages.

For subnetworks or devices that do not support IP multicast, the bulk data transmission is performed through an IP broadcast. Although broadcast transmissions of promotions would be sent to all devices, only those devices that have received transmission schedules will selectively receive the promotions from the data stream.

Once the promotions have been successfully installed, promotions may be activated at specified times or events indicated in the transmission schedules.

Scheduling Packages

In more detail regarding the generation of transmission schedules and transmission requests, the promotion scheduling process occurs in two interleaved phases with the promotion manager server 220 cyclically processing packages extracted from the database 210. The first phase involves the generation of transmission schedules and transmission requests from promotion packages. Transmission schedules and transmission requests are then utilized in the second phase of the delivery process for synchronizing bulk data transfers of promotion packages discussed previously. Transmission schedules are distributed to end node devices 300 of targeted promotion groups notifying them in advance of subsequent bulk data transfers, while transmission requests are delivered to bulk data servers 230 to initiate the transfers.

In brief overview, the generation of transmission schedules involves the promotion manager server 220 (1) extracting a set of packages from the database 210; (2) generating a map of device transmission schedules from the extracted packages; (3) iterating through the map of device transmission schedules generating individual schedule messages for each device; and (4) transmitting the individual schedule messages to each device in the map using standard messaging.

Figure 7:
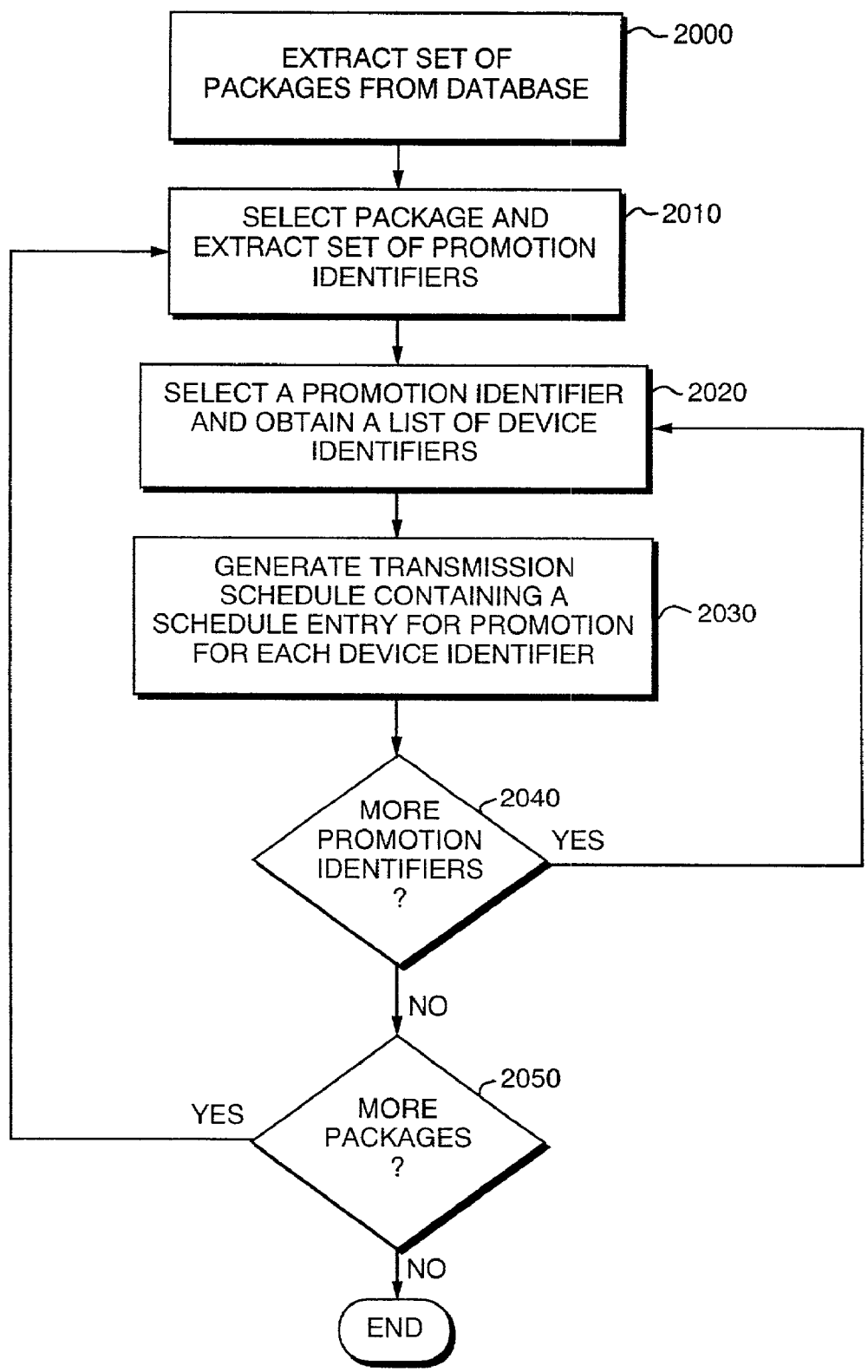
FIG. 7 is a flow diagram illustrating a process for generating transmission schedules for devices according to one embodiment.

In more detail, FIG. 7 is a flow diagram illustrating a process for generating transmission schedules for devices according to one embodiment.

In step 2000, the promotion manager server 220 extracts a set of packages that have not been processed for schedule distribution. According to one embodiment, a package indicates that it has not been processed for schedule distribution by setting its boolean INFO_TX_SENT parameter to false. Furthermore, the current system time should be within a specified range of the package's schedule transmission time (i.e., INFO_TX_TIME) for the package to be extracted. In one embodiment, the specified range is determined by the following:

$$(INFO\_TX\_TIME - \Delta T_{proc}/2) \leq T_{sys} \leq (INFO\_TX\_TIME + \Delta T_{proc}/2) \quad (1)$$

where $\Delta T_{proc}$ is the amount of time needed to process a maximum number of packages and $T_{sys}$ is the current system time.

Packages may be extracted at a variable polling rate. Limits may be configured relating to the minimum and maximum poll frequencies. However, the exact value of the polling rate at a given time is controlled by the promotion manager server 220 itself based on the current package load. As the number of packages processed per cycle remains constant or increases, the current polling rate decreases toward the minimum poll frequency value at configurable increments. Conversely, as the number of packages decreases, the polling rate increases toward the maximum poll frequency value at configurable increments.

Furthermore, the promotion manager server 220 maintains internal information relating to its own performance, specifically the rate at which packages are being processed. The host system on which a promotion manager server 220 executes indirectly affects the efficiency of the scheduling process. As the number of processes on the system changes, the physical resources made available to the promotion manager server 220 by the operating system vary. When the promotion manager server 220 has fewer resources, the average package-processing rate will increase. When the promotion manager server 220 has more resources, this time decreases.

In step 2010, after extracting the packages, the promotion manager server 220 serially processes the set of packages selecting a package in order of earliest package start time and extracting a set of promotion identifiers from the selected package.

In step 2020, the promotion manager server 220 selects one of the promotion identifiers and obtains a list of device identifiers representing actual end node devices that are targeted for the promotion.

In step 2030, the promotion manager server 220 generates a transmission schedule for each device identifier adding a schedule entry for the selected promotion. Each schedule entry contains promotion control data which identifies the promotion, transmission parameters, and activation criteria. According to one embodiment, transmission schedules are generated in memory as a stack of data objects representing multiple schedule entries generated from records within various tables of the database 210.

In more detail, the promotion is identified in a schedule entry by its module identifier. The module identifier corresponds to the promotion content stored in the database 210 and is associated with the promotion identifier. It is possible that multiple promotion identifiers may be associated with the same module identifier. The module identifier is used by the bulk data agent 320 of an end node device during a bulk data transmission to selectively receive promotion content in the data stream.

The transmission parameters identified in the schedule entry are obtained from the data transmission parameters of the selected package. According to one embodiment, the transmission parameters in the schedule entry may include a package transmission start time, the duration of the transmission, and IP multicast address and port number. Alternatively, the package transmission start time may be replaced with a trigger event similar to those for promotion activation. This information is used by the bulk data agent to receive the multicast transmission.

The activation criteria specified in the schedule entry is obtained from time slot records stored in the database 210 that are associated with the promotion identifiers. In general, the schedule entry specifies an activation trigger event for the promotion and the duration of the promotion. In particular, an activation trigger event may include a start time, a start message from the promotion manager server 220, the capture of ATVEF tag in the video blanking interval during a program broadcast, a channel change event, or a power event (e.g., OFF/ON).

In step 2040, the promotion manager server 220 determines whether there are more promotions to process for this package. If so, the process returns to step 2020 to select another promotion identifier from the package.

Otherwise, in step 2050, the promotion manager server 220 determines whether there are more packages to process. If so, the process returns to step 2010 to select the next package from the extracted set.

As processing proceeds to subsequent packages, additional schedule entries are added to previously existing transmission schedules. If a transmission schedule has not been created for a device, then a new transmission schedule is created and the schedule entry added. After the last package has been processed, the promotion manager has an map of device specific transmission schedules, keyed by device identifier.

After all of the packages have been processed, the promotion manager server 220 iterates through the map of device transmission schedules serializing each one. Serializing transforms the stack of data objects into binary serial data that may be transmitted in the payloads of transmission schedule messages. Due to the fixed payload size of a message, more than one schedule message may be required to deliver the entire transmission schedule to a device. The schedule messages are sent with an expiration time such that the delivery time is limited. In the case of message delivery failure where the delivery time expires with no message acknowledgment from a device, transmission errors are reported in an error queue, and error information is captured in the database as well. The promotion manager server 220 may then retransmit the schedule message. As schedule message deliveries proceed, the INFO_TX_SENT flag in each package is set to true and the schedule distribution process concludes.

Upon reception at an end node device, the promotion agent regenerates the stack of data objects by de-serializes it into memory where it is used to drive the promotion reception and delivery process on the device.

Once the transmission schedules have been delivered, transmission requests are generated to initiate the scheduled transmissions from bulk data servers located at the data center or head ends of a multimedia network. In brief overview, the generation of transmission requests involves the promotion manager server 220 (1) extracting a set of packages from the database 210; (2) generating an individual transmission request for each of the extracted packages; and (3) transmitting the transmission request to a bulk data server using standard messaging.

Figure 8:
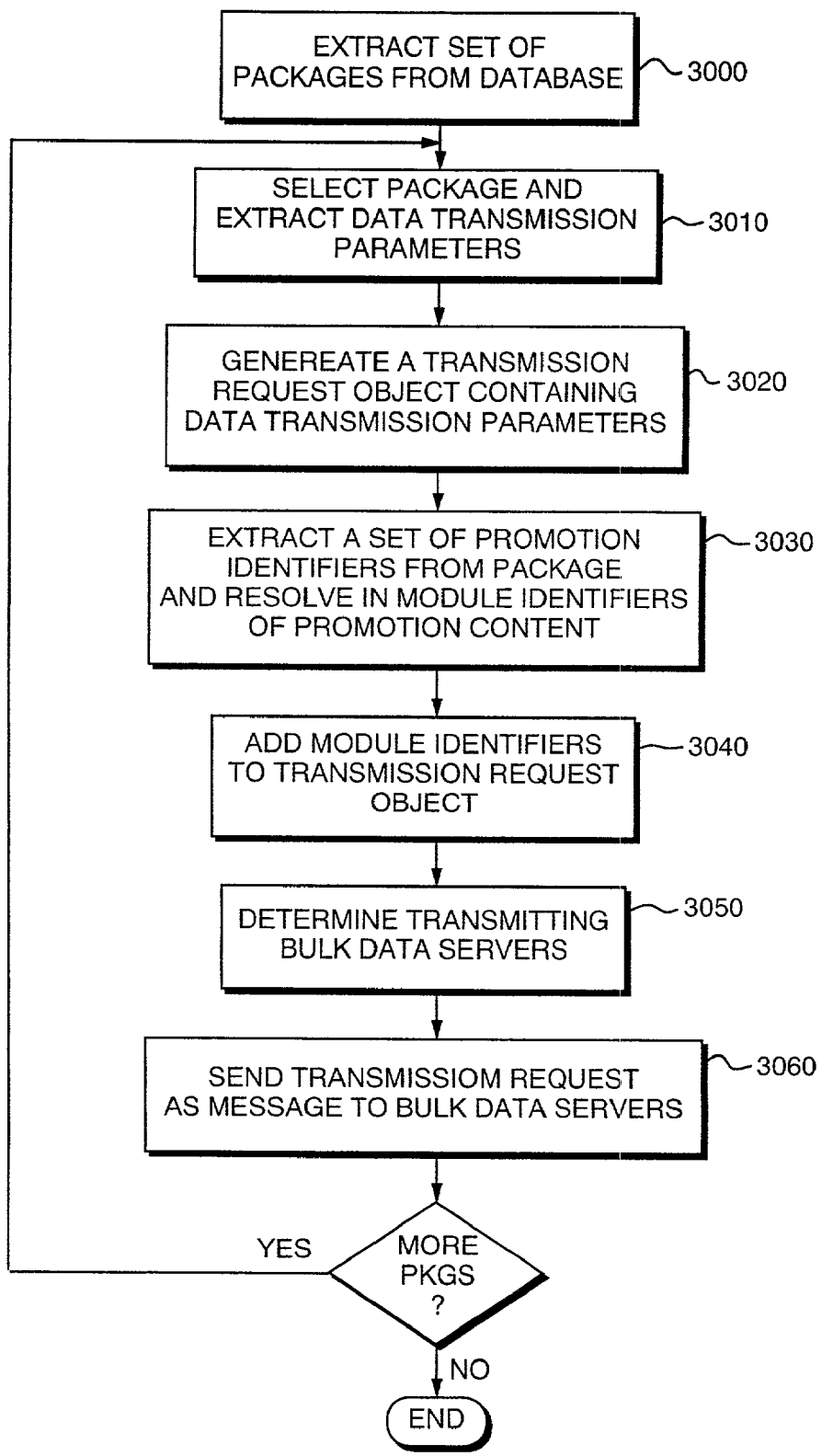
FIG. 8 is a flow diagram illustrating a process of generating transmission requests according to one embodiment.
Figure 10B:
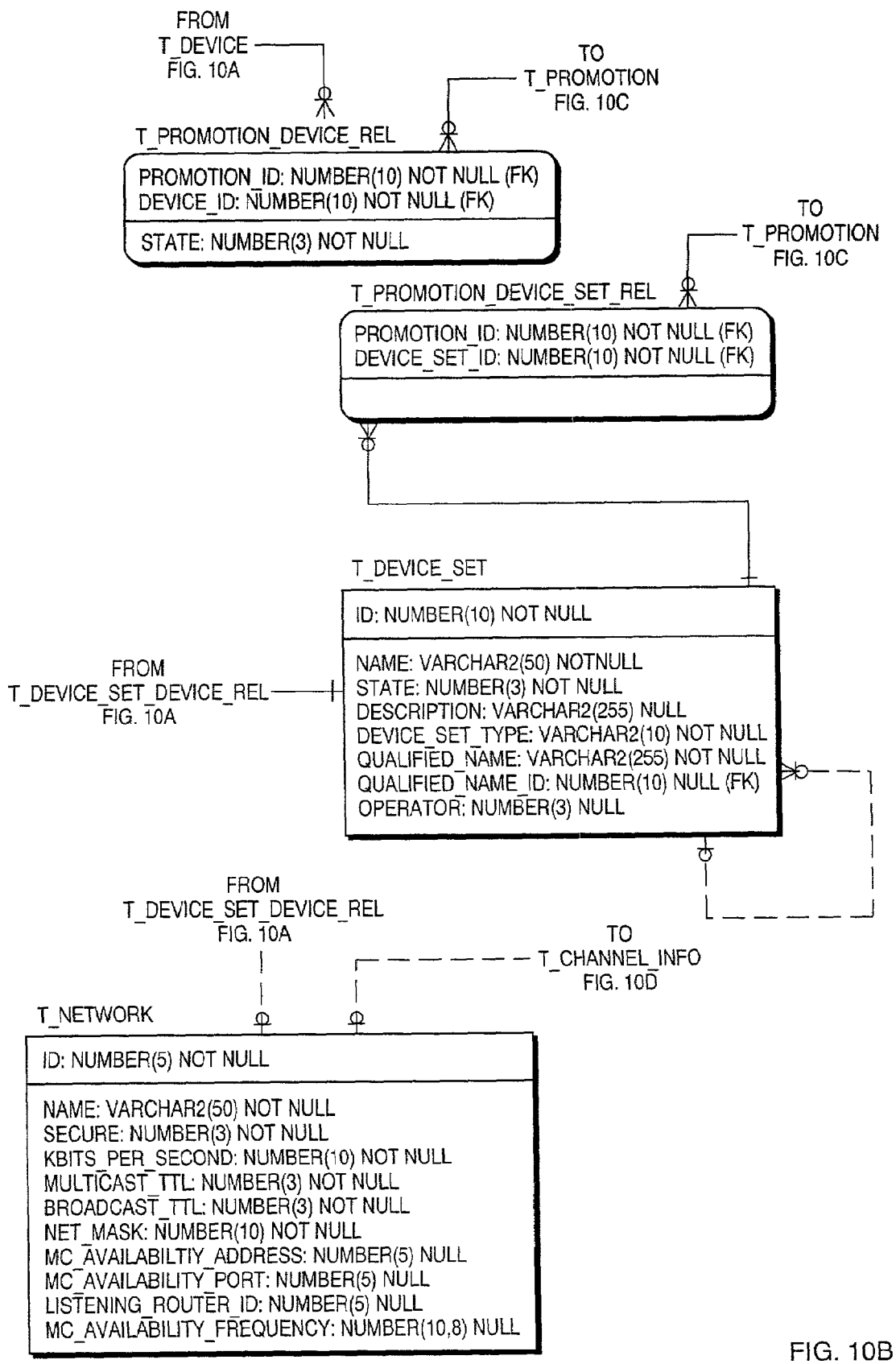
Figure 10C:
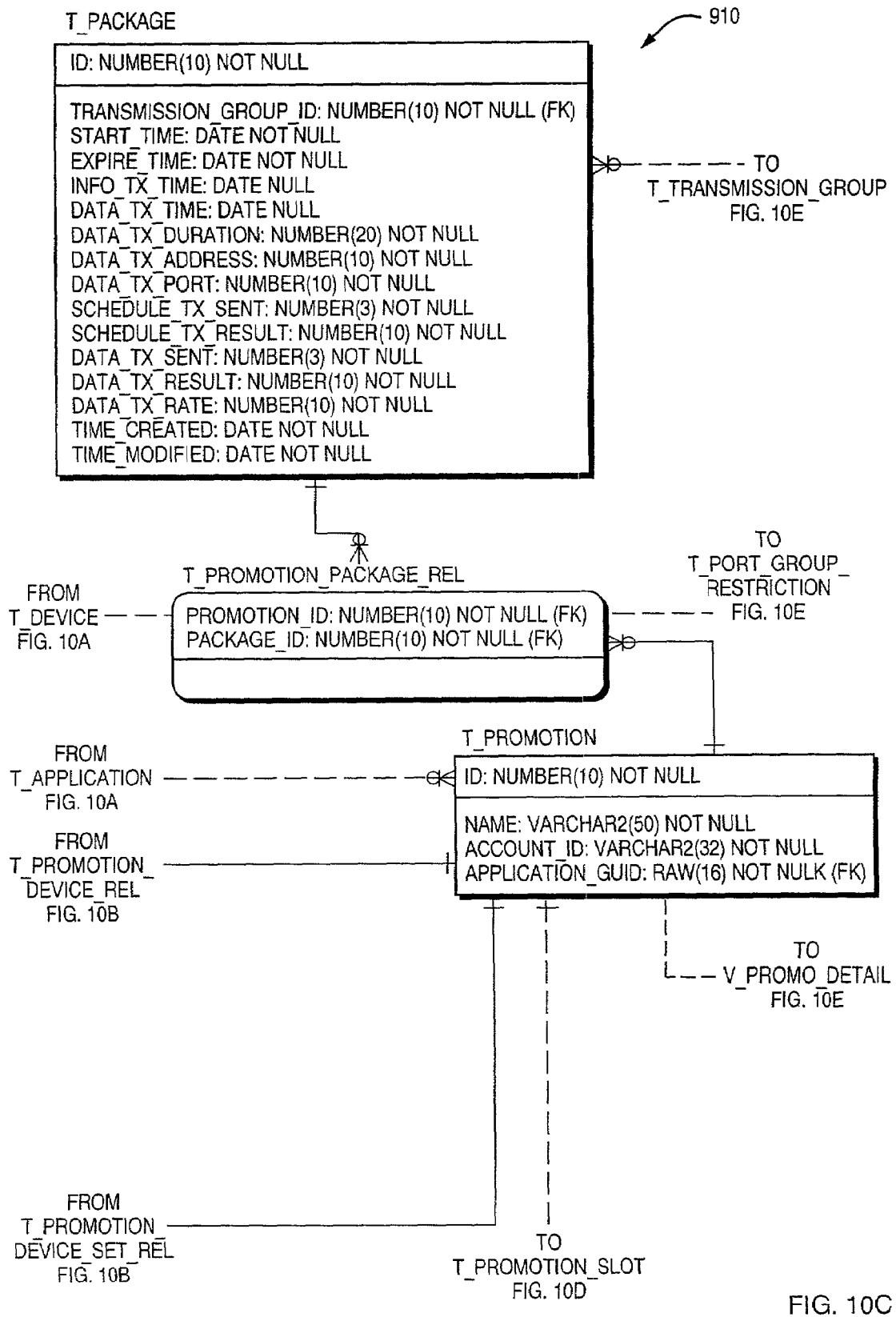
Figure 10D:
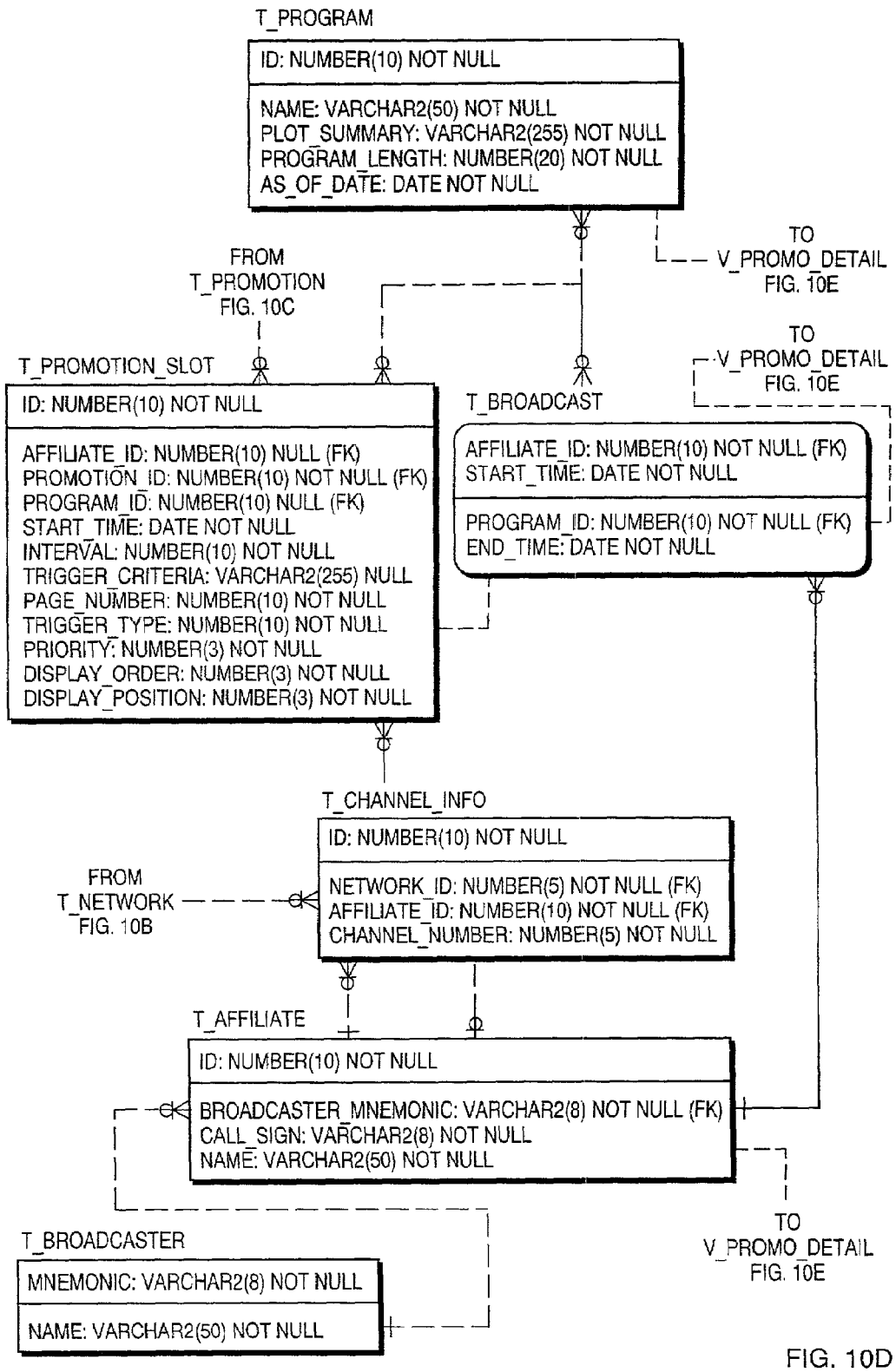
Figure 10E:
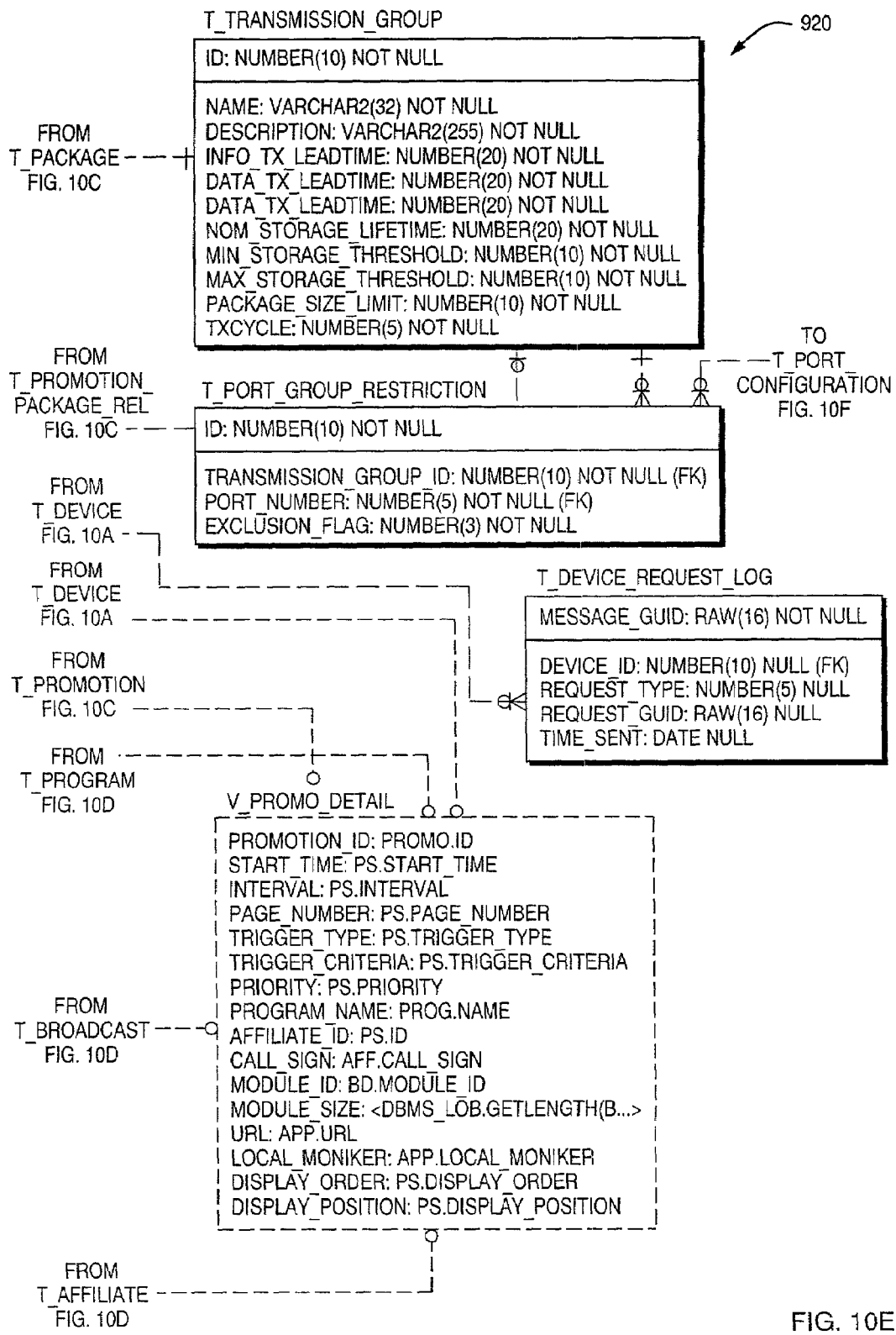
Figure 10F:
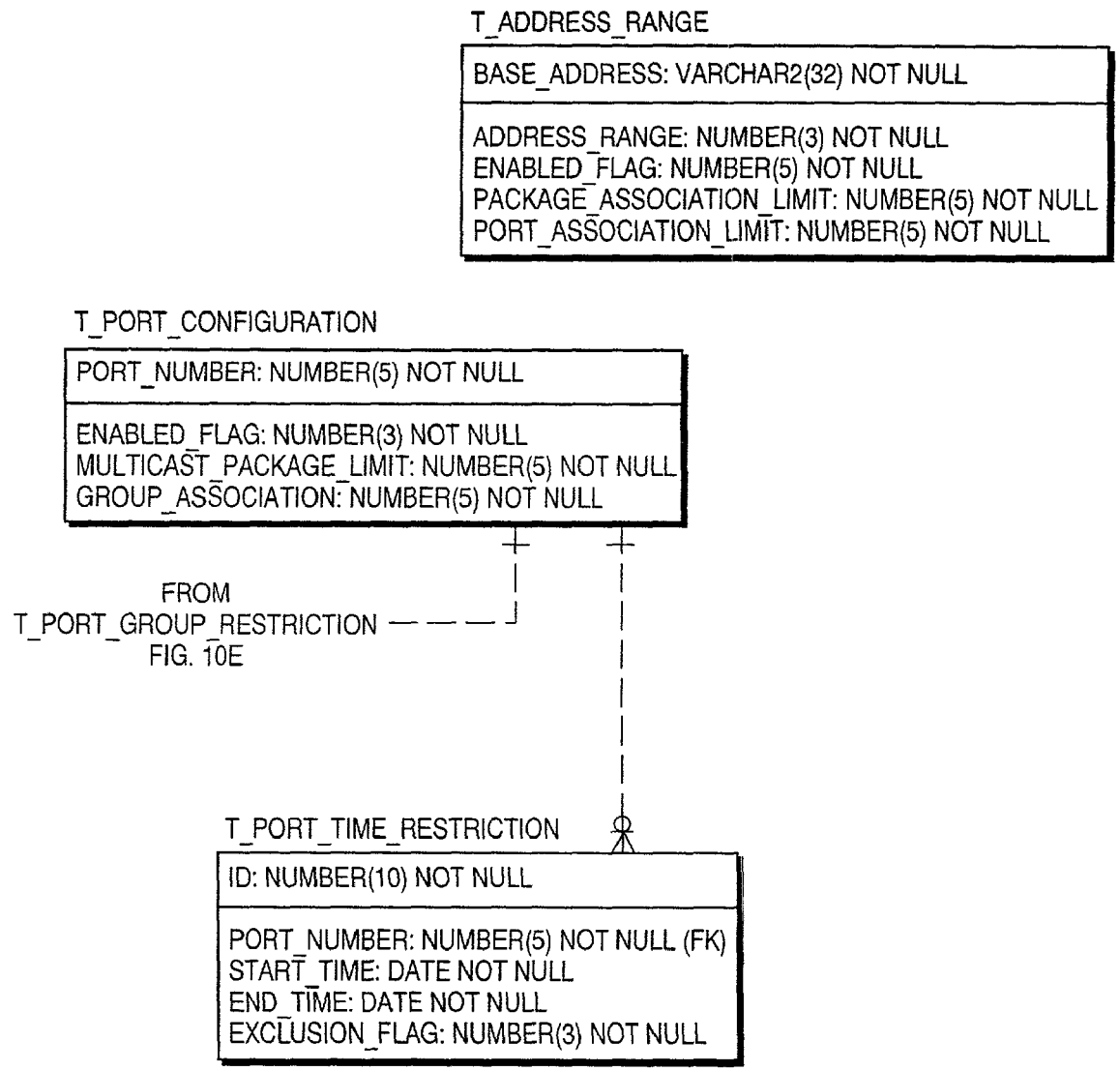

In more detail, FIG. 8 is a flow diagram illustrating a process of generating transmission requests according to one embodiment.

In step 3000, the promotion manager server 220 extracts a set of packages whose transmission schedules have been distributed but have not been processed for data transmission. The extraction of the set of packages for data transmission may occur simultaneously with the extraction of packages for transmission schedule distribution. However, once extracted, packages are processed serially in order of earliest package start time, with data transmissions taking priority over schedule transmissions.

According to one embodiment, a package indicates that its promotions have not been delivered by setting its boolean DATA_TX_SENT parameter to false. Furthermore, the current system time should be within a specified range of the package's data transmission time (i.e., DATA_TX_TIME) for a package to be extracted. The specified range may be determined by the following:

$$(\text{DATA\_TX\_TIME} - \Delta T_{proc}/2) \leq T_{system} \leq (\text{DATA\_TX\_TIME} + \Delta T_{proc}/2) \quad (2)$$

where $\Delta T_{proc}$ is the amount of time needed to process a maximum number of packages and $T_{sys}$ is the current system time.

In step 3010, after extracting the packages, the promotion manager server 220 serially processes the set of packages selecting a package in order of earliest package start time and extracting the data transmission parameters from the package. Each package contains all of the parameters needed to initiate a multicast data transmission. Such parameters include the transmission start time, the duration of the transmission, the data transmission rate, and the IP multicast address and port.

In step 3020, the promotion manager server 220 creates a transmission request object for the package containing the extracted data transmission parameters. These parameters control the time and manner of transmitting the packages.

In step 3030, the promotion manager server 220 extracts the set of promotion identifiers from the package and resolves them into the associated module identifiers that correspond to the actual promotion content stored in the database 210.

In step 3040, the promotion manager server 220 adds each of the module identifiers to the transmission request object. FIG. 9 is a table illustrating the parameters of a transmission request according to one embodiment.

In step 3050, the promotion manager server 220 determines which bulk data servers 320 are to transmit promotion packages and thus receive the transmission request. According to one embodiment, the promotion manager server 220 resolves each package into a list of the network identifiers that need to multicast the data. The list of network identifiers is distilled from the list of promotion recipients (i.e., device identifiers). From the network identifiers, a message router 250-$n$ servicing each network identifier is determined. Transmission request messages are then sent to each of the bulk data servers 230 that services head end networks 50 via the message routers.

In step 3060, the promotion manager server 220 serializes the transmission request object and sends it in the payload of messages to the appropriate bulk data servers that will handle the bulk data transfers of the identified promotion content as specified.

FIGS. 10A-10F is a diagram illustrating the organization of the tables of records within the database 210 according to one embodiment. The solid and dotted lines illustrate the interrelations among various records. For example according to one embodiment T_PACKAGE 910 is database record within a table of other T_PACKAGEs implementing a package. The package is adapted for the common attributes of a transmission group through a parameter which references the group identifier for a particular transmission group (i.e. TRANSMISSION_GROUP_ID). This identifier is used to index into a table of T_TRANSMISSION_GROUP records 920 that specify parameters for data transmission, such as maximum storage threshold and data transmission rates, to the member devices of the transmission group, such as a particular class of set top boxes.

While this invention has been particularly shown and described with references to preferred embodiments thereof, it will be understood by those skilled in the art that various changes in form and details may be made therein without departing from the scope of the invention encompassed by the appended claims.

What is claimed is:

1. A promotion scheduling process for generating schedules notifying end node devices in advance of data transfer, comprising:

selecting a set of promotion packages from a database, the selected set of promotion packages being sent as subsequent bulk data transfers;

generating transmission schedules for end node devices from the selected set of promotion packages prior to the subsequent bulk data transfers being sent, each transmission schedule customized for an individual end node device, the transmission schedules preparing each end node device on an individual basis for receiving the subsequent bulk data transfers in advance of the subsequent bulk data transfers being sent;

addressing each customized transmission schedule as an individual message to be received by an individual end node device; and individually transmitting each of the customized transmission schedules as an individual message to each of the end node devices prior to the subsequent bulk data transfers being sent, wherein the step of generating transmission schedules further comprises:

selecting a promotion identified in a package;

determining the end node devices targeted for the promotion; and adding a schedule entry for each device targeted for the promotion, the schedule entry specifying promotion control data, the promotion control data identifies the promotion and specifies transmission parameters for the promotion; and wherein the transmission parameters specified in the schedule entry comprise a package transmission start time, transmission duration, and a network address for selectively receiving promotions from a data transmission.

2. The promotion scheduling process of claim 1, wherein a transmission schedule for a device comprises at least one schedule entry corresponding to a promotion targeted for the device.

3. The promotion scheduling process of claim 1, wherein a transmission schedule for a device comprises schedule entries for promotions from different packages.

4. The promotion scheduling process of claim 2, wherein the promotion is identified with a module identifier, the module identifier uniquely identifying promotion content stored in the database.

5. The promotion scheduling process of claim 1, wherein the network address is a multicast address and port number.

6. The promotion scheduling process of claim 1, wherein the transmission parameters specified in the schedule entry comprise a trigger event for initiating reception of promotions from a data transmission.

7. The promotion scheduling process of claim 1, wherein the activation criteria for a promotion specified in the schedule entry comprises a trigger event.

8. The promotion scheduling process of claim 7, wherein the trigger event is a start time.

9. The promotion scheduling process of claim 7, wherein the trigger event is receipt of a start message, the start message directing the device to activate the promotion.

10. The promotion scheduling process of claim 7, wherein the trigger event is capture of a start tag transmitted in the video blanking interval during a program broadcast.

11. The promotion scheduling process of claim 10, wherein the start tag is an Advanced Television Enhancement Forum (ATVEF) tag.

12. The promotion scheduling process of claim 7, wherein the trigger event is a channel change event.

13. The promotion scheduling process of claim 7, wherein the trigger event is a power event.

14. The promotion scheduling process of claim 1, wherein a transmission schedule is a stack of data objects, each data object representing a schedule entry.

15. The promotion scheduling process of claim 1, wherein transmitting the customized transmission schedules to the end node devices, further comprises:

generating a schedule message for each of the end node devices targeted for at least one promotion; and transmitting a customized transmission schedule within a schedule message to the targeted end node device.

16. The promotion scheduling process of claim 15, wherein one or more schedule messages are generated to transmit a transmission schedule to a device.

17. The promotion scheduling process of claim 1, wherein packages are selected in order of earliest package start time.

18. The promotion scheduling process of claim 1, wherein packages are selected at a variable polling rate.

19. The promotion scheduling process of claim 18, wherein the variable polling rate for selecting packages decreases when the number of packages previously processed remains constant or increases.

20. The promotion scheduling process of claim 18, wherein the variable polling rate for selecting packages increases when the number of packages previously processed decreases.

21. The promotion scheduling process of claim 18, wherein the variable polling rate increases when less system resources are available for processing packages.

22. The promotion scheduling process of claim 18, wherein the variable polling rate decreases when more system resources are available for processing packages.

23. A promotion scheduling process as in claim 1 further comprising:

generating a transmission request for each selected package; and transmitting the transmission request to a bulk data server, the bulk data server initiating the data transmission of promotions identified in the set of promotion packages.

24. The promotion scheduling process of claim 23, wherein a transmission request is a data object comprising parameters controlling transmission of promotions from a package.

25. The promotion scheduling process of claim 23, wherein a transmission request is generated for the set of packages in order of earliest package start time.

26. The promotion scheduling process of claim 23, wherein generating a transmission request for a selected package, further comprises:

identifying promotions referenced in the package;

determining module identifiers for each of the promotions, a module identifier identifying promotion content in the database selected for transmission; and adding the module identifiers to the transmission request.

27. A promotion scheduling process as in claim 1 further comprising:

generating a transmission request for each selected package;

determining one or more bulk data servers to process the transmission request initiating the data transmission of promotions identified in the set of promotion packages, each bulk data server serving a subnetwork within a multimedia network; and transmitting the transmission request to the one or more bulk data servers.

28. The promotion scheduling process of claim 27, wherein determining the bulk data servers to process the transmission request further comprises:

resolving each package into a list of networks hosting end node devices targeted for at least one promotion; and transmitting the transmission request to each bulk data server serving the networks identified.

29. A promotion scheduling system for generating schedules notifying end node devices in advance of data transfer, comprising:

a promotion manager server;

the promotion manager server selecting a set of promotion packages from a database, the selected set of promotion packages being sent as subsequent bulk data transfers;

the promotion manager server generating transmission schedules for end node devices from the selected set of promotions packages prior to the subsequent bulk data transfers being sent, each transmission schedule customized for an individual end node device, the transmission schedules preparing each end node device on an individual basis for receiving the subsequent bulk data transfers in advance of the subsequent bulk data transfers being sent;

the promotion manager server addressing each customized transmission schedule as an individual message to be received by an individual end node device; and the promotion manager server individually transmitting each of the customized transmission schedules as an individual message to each of the end node devices prior to the subsequent bulk data transfers being sent, wherein generating transmission schedules further comprises:

selecting a promotion identified in a package;

determining the end node devices targeted for the promotion; and adding a schedule entry for each device for the promotion, the schedule entry specifying promotion control data, the promotion control data identifies the promotion and specifies transmission parameters for the promotion; and wherein the transmission parameters specified in the schedule entry comprise a package transmission start time, transmission duration, and a network address for selectively receiving promotion from a data transmission.

30. A promotion scheduling system as in claim 29 further comprising:

a bulk data server;

the promotion manager server generating a transmission request for each selected package;

the promotion manager server transmitting the transmission request to the bulk data server; and the bulk data server initiating the data transmission of promotions identified in the set of packages.

31. A promotion scheduling system as in claim 29 further comprising:

one or more bulk data servers;

the promotion manager server generating a transmission request for each selected package;

the promotion manager server determining the one or more bulk data servers to process the transmission request initiating the data transmission of promotions identified in the set of packages, each bulk data server serving a subnetwork within a multimedia network; and the promotion manager server transmitting the transmission request to the one or more bulk data servers.

* * * * *